United States Patent [19]
Ozaki

[11] Patent Number: 5,412,768
[45] Date of Patent: May 2, 1995

[54] METHOD AND APPARATUS FOR ROTATING AN IMAGE

[75] Inventor: Yutaka Ozaki, Yokohama, Japan

[73] Assignee: Matsushita Graphic Communication Systems, Inc., Tokyo, Japan

[21] Appl. No.: 227,088

[22] Filed: Apr. 13, 1994

Related U.S. Application Data

[63] Continuation of Ser. No. 642,742, Jan. 17, 1991, abandoned.

[30] Foreign Application Priority Data

Jan. 22, 1990 [JP] Japan ..................... 2-13164
Jan. 22, 1990 [JP] Japan ..................... 2-13165

[51] Int. Cl.$^6$ ............................. G06F 15/62
[52] U.S. Cl. ................................. 395/137
[58] Field of Search ............... 395/133, 137, 138, 155, 395/161, 162, 164; 382/44, 46; 345/121, 126

[56] References Cited

U.S. PATENT DOCUMENTS 4,843,405 6/1989 Morikawa et al. ............. 346/1.1
4,985,849 1/1991 Hideoki ........................ 364/518

FOREIGN PATENT DOCUMENTS 62-111364 5/1987 Japan .

*Primary Examiner*—Phu K. Nguyen
*Attorney, Agent, or Firm*—Lowe, Price, LeBlanc & Becker

[57] ABSTRACT

In a method and an an apparatus for rotating a source image about a reference point on a reference coordinate axis through an arbitrary angle $\theta$ to obtain a destination image, the source image is represented by a group of reference blocks. Each of the reference blocks has $N \times N$ pixels and is composed of a square having a side parallel to an axis which is rotated relative to the reference coordinate axis by an angle of $\times \theta$. One of vertexes of each of the reference blocks is defined as a rotation center vertex. Each of the reference blocks is rotated about the rotation center vertex by an angle of $\theta$ to obtain a rotation block. Calculations are made on shift quantities $\Delta Y$ and $\Delta X$ of the rotation center vertex of each of the rotation blocks. The shift quantities $\Delta Y$ and $\Delta X$ result from a rotation of the rotation center vertex about the reference point through an angle of $\theta$. The shift quantity $\Delta Y$ is defined as extending along the reference coordinate axis, and the shift quantity $\Delta X$ is defined as extending perpendicular to the reference coordinate axis. The rotation block is translated in a direction of the reference coordinate axis by the shift quantity $\Delta Y$, and is translated in a direction perpendicular to the reference coordinate axis by the shift quantity $\Delta X$ to obtain the destination image.

11 Claims, 16 Drawing Sheets

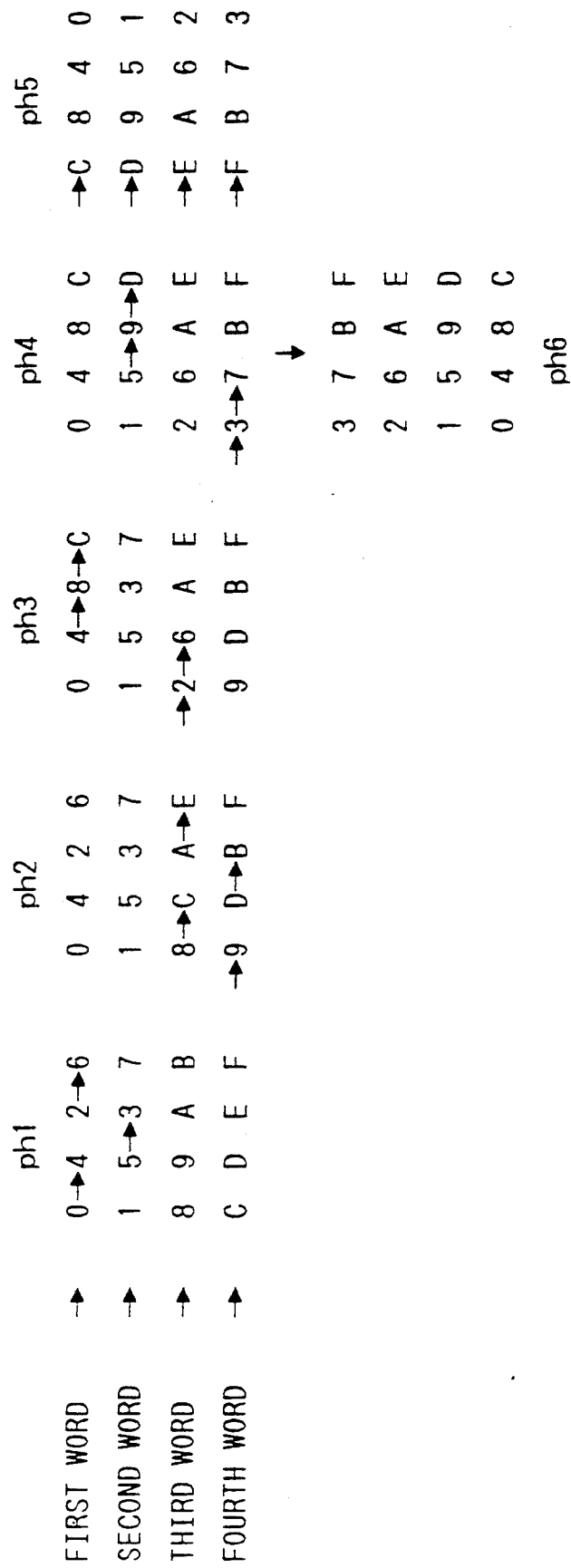

FIG. 5

|  | | | | |
|---|---|---|---|---|
| FIRST WORD | — | 0 | 1 | 2 | 3 |
| SECOND WORD | — | 4 | 5 | 6 | 7 |
| THIRD WORD | — | 8 | 9 | A | B |
| FOURTH WORD | — | C | D | E | F |

FIG. 2 PRIOR ART

```
              ph1             ph2             ph3             ph4             ph5             ph6
FIRST WORD →  0  *  *  *      0  *  *  *      0  *  *  *      0  *  *  *      0→4  *  *  *   0  4  *  *  *
SECOND WORD→  1  *  *  *      1  *  *  *      1  *  *  *      1  *  *  *      1  *  *  *      1→5  *  *  *
THIRD WORD →  2→6  *  *       2  *  *  *      2  *  *  *      2  *  *  *      2  *  *  *      2  6  *  *
FOURTH WORD→  3  *  *  *      3→7  *  *       2→3  *  *       3  *  *  *      3  *  *  *      3  7→B  * ph7             ph8             ph9             ph10            ph11            ph12
FIRST WORD →  0  4  *  *      0  4  *  *      0  4  *  *      0  4  8  *      0  4  8  *      0  4  8  *
SECOND WORD→  1  5  *  *      1  5  *  *      1  5  *  *      1  5→9  *      1  5  9  *      1  5  9  A
THIRD WORD →  2  6  *  *      2  6  *  *      2  6  *  *      2  6  *  *      2  6→A  *      2  6  A
FOURTH WORD→  3  *  *  *      3  7  *  *      3  7  *  *      3  7  *  *      3  7  *  *      3  7→B ph13            ph14            ph15            ph16            ph17
FIRST WORD →  0  4  8→C  *    0  4  8  C      0  4  8  C      0  4  8  C  D    ↑C 8 4 0
SECOND WORD→  1  5  9  *      1  5  9→D      1  5  9  D      1  5  9  D        ↑D 9 5 1
THIRD WORD →  2  6  A  *      2  6  A  *      2  6  A→E      2  6  A  E        ↑E A 6 2
FOURTH WORD→  3  7  B  *      3  7  B  *      3  7  B  *      3  7  B→F        ↑F B 7 3
```

FIG. 3
PRIOR ART

|  | ph1 | | | | ph2 | | | | ph3 | | | | ph4 | | | | ph5 | | | |
|---|---|---|---|---|---|---|---|---|---|---|---|---|---|---|---|---|---|---|---|---|
| FIRST WORD | →0 | 4 | 8 | C | 0 | 4 | 8 | C | 0 | 4 | 8 | C | 0 | 4 | 8 | C | →C | 8 | 4 | 0 |
| SECOND WORD | * | * | * | * | →1 | 5 | 9 | D | 1 | 5 | 9 | D | 1 | 5 | 9 | D | →D | 9 | 5 | 1 |
| THIRD WORD | * | * | * | * | * | * | * | * | →2 | 6 | A | E | 2 | 6 | A | E | →E | A | 6 | 2 |
| FOURTH WORD | * | * | * | * | * | * | * | * | * | * | * | * | →3 | 7 | B | F | →F | B | 7 | 3 |

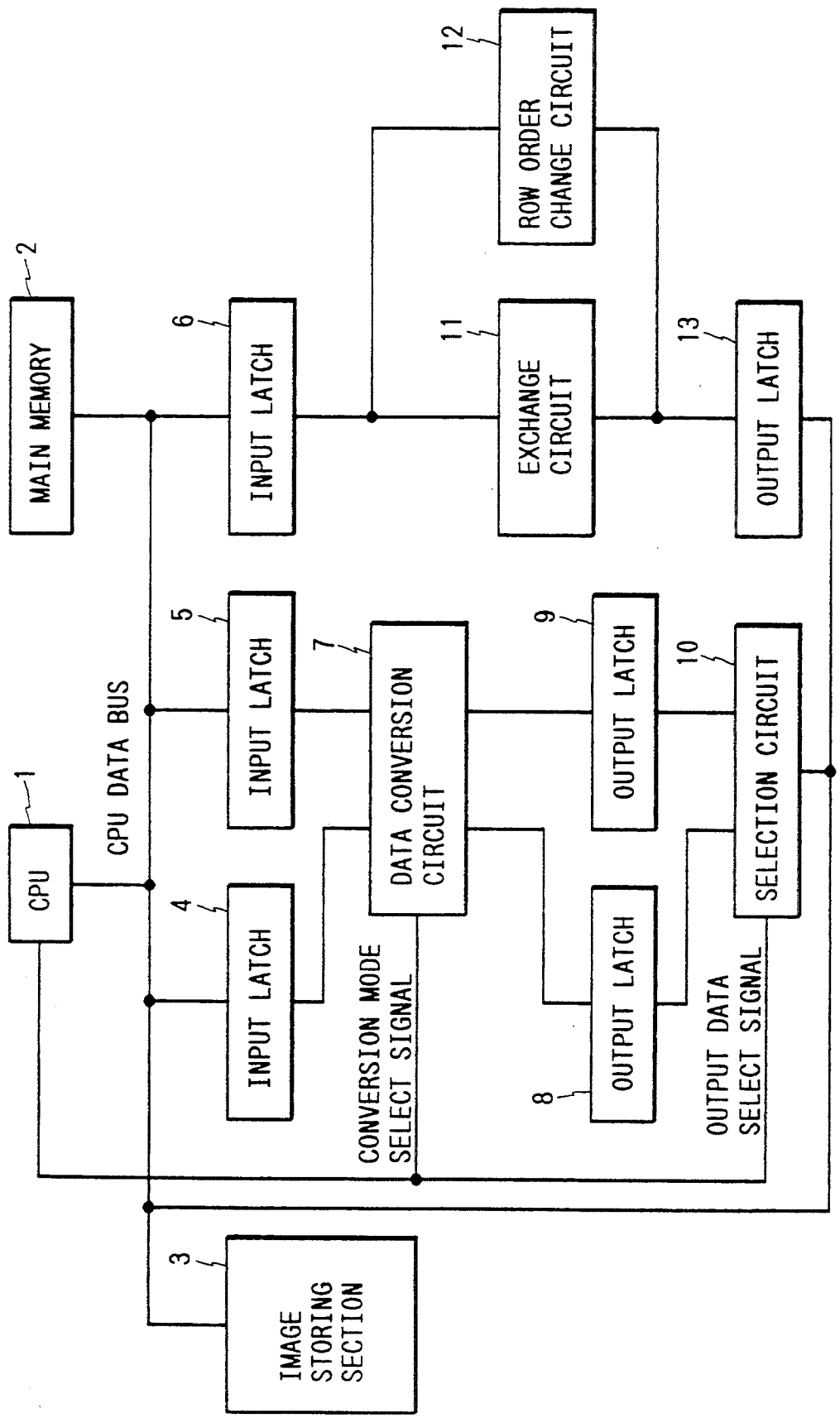

SOURCE DATA

| 0 | 1 | 2 | 3 | 4 | 5 | 6 | 7 | 8 |

DATA OBTAINED
BY CONTRACTION

| 0 | 1 | 3 | 4 | 6 | 7 |

SOURCE DATA

| 3 LINE |
| 2 LINE |
| 1 LINE |
| 0 LINE |

DATA OBTAINED
BY EXPANSION

| 3 LINE | ← 5 LINE |
| 2 LINE | ← 4 LINE |
| 2 LINE | ← 3 LINE |
| 1 LINE | ← 2 LINE |
| 0 LINE | ← 1 LINE |
| 0 LINE | ← 0 LINE |

METHOD AND APPARATUS FOR ROTATING AN IMAGE

This application is a continuation of application Ser. No. 07/642,742, filed Jan. 17, 1991, now abandoned.

BACKGROUND OF THE INVENTION

This invention relates to a method and an apparatus for rotating an image.

In the art of graphics and video signal processing, there are various known ways of processing a video signal to rotate a reproduced image through a given angle. As will be explained later, prior art methods of rotating an image have some problems.

SUMMARY OF THE INVENTION

It is an object of this invention to provide an improved method of rotating an image.

It is another object of this invention to provide an improved apparatus for rotating an image.

A first aspect of this invention provides a method of rotating an image through 90 degrees, comprising the steps of calculating a conversion mode number M with respect to image of N rows×N columns by referring to an equation expressed as: $M=[\log_2 N]$ where when a numeral within a bracket "[ ]" is equal to an integer, the bracket denotes the integer; and when a numeral within the brackets contains a fraction, the bracket denotes an integer which is obtained by counting the fraction as one; numbering the N rows by $0 \sim N-1$; calculating rows having numbers A and B for each of conversion modes L ($=1 \sim M$) by referring to equations expressed as:

$$A = k*2^L \sim k*2^L + 2^{L-1} - 1$$

$$B = A + 2^{L-1}$$

$$k = 0 \sim (N/2^L) - 1$$

where a character "*" denotes an operator of product; representing row bit arrangements of the rows having the numbers A and B by A(j) and B(j) respectively; converting the row bit arrangements A(j) and B(j) into bit arrangements A'(j) and B'(j) by referring to equations expressed as:

$$\begin{aligned} &A'(j) = A(j) \\ &\quad j = k*2^L \sim k*2^L + 2^{L-1} - 1 \\ &A'(j) = B(j - 2^{L-1}) \\ &\quad j = k*2^L + 2^{L-1} \sim k*2^L + 2^L - 1 \\ &B'(j) = B(j) \\ &\quad j = k*2^L + 2^{L-1} \sim k*2^L + 2^L - 1 \\ &B'(j) = A(j + 2^{L-1}) \\ &\quad j = k*2^L \sim k*2^L + 2^{L-1} - 1 \\ &k = 0 \sim (N/2^L) - 1; \end{aligned}$$

varying L from 1 to M and thereby deriving conversion image data of N rows×N columns; representing bit arrangements of rows of the conversion image data by E(j); and converting the bit arrangements of the rows of the conversion image data by referring to equations expressed as:

$$F(j) = E(N-j-1), j = 0 \sim N-1$$

where F(j) denotes rows composing 90-degree clockwise-rotated image data of N rows×N columns.

A second aspect of this invention provides a method of rotating an image through 90 degrees, comprising the steps of calculating a conversion mode number M with respect to image data of N rows×N columns by referring to an equation expressed as: $M=[\log_2 N]$ where when a numeral within a bracket "[ ]" is equal to an integer, the bracket denotes the integer; and when a numeral within the bracket contains a fraction, the bracket denotes an integer which is obtained by counting the fraction as one; numbering the N rows by $0 \sim N-1$; calculating rows having numbers A and B for each of conversion modes L ($=1 \sim M$) by referring to equations expressed as:

$$A = k*2^L \sim k*2^L + 2^{L-1} - 1$$

$$B = A + 2^{L-1}$$

$$k = 0 \sim (N/2^L) - 1$$

where a character "*" denotes an operator of product; representing row bit arrangements of the rows having the numbers A and B by A(j) and B(j) respectively; converting the row bit arrangements A(j) and B(j) into bit arrangements A'(j) and B'(j) by referring to equations expressed as:

$$\begin{aligned} &A'(j) = A(j) \\ &\quad j = k*2^L \sim k*2^L + 2^{L-1} - 1 \\ &A'(j) = B(j - 2^{L-1}) \\ &\quad j = k*2^L + 2^{L-1} \sim k*2^L + 2^L - 1 \\ &B'(j) = B(j) \\ &\quad j = k*2^L + 2^{L-1} \sim k*2^L + 2^L - 1 \\ &B'(j) = A(j + 2^{L-1}) \\ &\quad j = k*2^L \sim k*2^L + 2^{L-1} - 1 \\ &k = 0 \sim (N/2^L) - 1; \end{aligned}$$

varying L from 1 to M and thereby deriving conversion image data of N rows×N columns; representing an "i" row of the conversion image data by E(i,j); and changing the rows of the conversion image data by referring to equations expressed as:

$$E'(i,j) = E(N-i-1,j), i = 0 \sim N-1$$

where E'(i,j) denotes rows composing 90-degree counterclockwise-rotated image data of N rows×N columns.

A third aspect of this invention provides an apparatus for rotating an image through 90 degrees, comprising means for calculating a conversion mode number M with respect to image data of N rows×N columns by referring to an equation expressed as: $M=[\log_2 N]$ where when a numeral within a bracket "[ ]" is equal to an integer, the bracket denotes the integer; and when a numeral within the bracket contains a fraction, the bracket denotes an integer which is obtained by counting the fraction as one; means for numbering the N rows by $0 \sim N-1$; means for calculating rows having numbers A and B for each of conversion modes L ($=1 \sim M$) by referring to equations expressed as:

$$A = k*2^L \sim K*2^L + 2^{L-1} - 1$$

$$B = A + 2^{L-1}$$

$$k = 0 \sim (N/2^L) - 1$$

where a character "*" denotes an operator of product; means for representing row bit arrangements of the rows having the numbers A and B by A(j) and B(j) respectively; means for converting the row bit arrangements A(j) and B(j) into bit arrangements A'(j) and B'(j) by referring to equations expressed as:

$$A'(j) = A(j)$$
$$j = k*2^L \sim k*2^L + 2^{L-1} - 1$$
$$A'(j) = B(j - 2^{L-1})$$
$$j = k*2^L + 2^{L-1} \sim k*2^L + 2^L - 1$$
$$B'(j) = B(j)$$
$$j = k*2^L + 2^{L-1} \sim k*2^L + 2^L - 1$$
$$B'(j) = A(j + 2^{L-1})$$
$$j = k*2^L \sim k*2^L + 2^{L-1} - 1$$
$$k = 0 \sim (N/2^L) - 1;$$

means for varying L from 1 to M and thereby deriving conversion image data of N rows×N columns; means for representing bit arrangements of rows of the conversion image data by E(j); means for converting the bit arrangements of the rows of the conversion image data by referring to equations expressed as:

$$F(j)=E(N-j-1), j=0 \sim N-1$$

where F(j) denotes rows composing 90-degree clockwise-rotated image data of N rows×N columns; means for representing an "i" row of the conversion image data by E(i,j); and means for changing the rows of the conversion image data by referring to equations expressed as:

$$E'(i,j)=E(N-i-1,j), i=0 \sim N-1$$

where E'(i,j) denotes rows composing 90-degree counterclockwise-rotated image data of N rows×N columns.

A fourth aspect of this invention provides a method of rotating a source image about a reference point on a reference coordinate axis through an arbitrary angle $\theta$ to obtain a destination image, comprising the steps of representing the source image by a group of reference blocks, wherein each of the reference blocks has N×N pixels and is composed of a square having a side parallel to an axis which is rotated relative to the reference coordinate axis by an angle of $-\theta$; defining one of vertexes of each of the reference blocks as a rotation center vertex; rotating each of the reference blocks about the rotation center vertex by an angle of $\theta$ to obtain a rotation block; calculating shift quantities $\Delta Y$ and $\Delta X$ of the rotation center vertex of each of the rotation blocks, wherein the shift quantities $\Delta Y$ and $\Delta X$ result from a rotation of the rotation center vertex about the reference point through an angle of $\theta$, and wherein the shift quantity $\Delta Y$ is defined as extending along the reference coordinate axis and the shift quantity $\Delta X$ is defined as extending perpendicular to the reference coordinate axis; and translating the rotation block in a direction of the reference coordinate axis by the shift quantity $\Delta Y$ and translating the rotation block in a direction perpendicular to the reference coordinate axis by the shift quantity $\Delta X$ to obtain the destination image.

A fifth aspect of this invention provides an apparatus for rotating a source image about a reference point on a reference coordinate axis through an arbitrary angle $\theta$ to obtain a destination image, comprising means for representing the source image by a group of reference blocks, wherein each of the reference blocks has N×N pixels and is composed of a square having a side parallel to an axis which is rotated relative to the reference coordinate axis by an angle of $-\theta$; means for defining one of vertexes of each of the reference blocks as a rotation center vertex; means for rotating each of the reference blocks about the rotation center vertex by an angle of $\theta$ to obtain a rotation block; means for calculating shift quantities $\Delta Y$ and $\Delta X$ of the rotation center vertex of each of the rotation blocks, wherein the shift quantities $\Delta Y$ and $\Delta X$ result from a rotation of the rotation center vertex about the reference point through an angle of $\theta$, and wherein the shift quantity $\Delta Y$ is defined as extending along the reference coordinate axis and the shift quantity $\Delta X$ is defined as extending perpendicular to the reference coordinate axis; and means for translating the rotation block in a direction of the reference coordinate axis by the shift quantity $\Delta Y$ and translating the rotation block in a direction perpendicular to the reference coordinate axis by the shift quantity $\Delta X$ to obtain the destination image.

BRIEF DESCRIPTION OF THE DRAWINGS

FIG. 1 diagram showing a source image matrix in a prior art method.

FIG. 2 is a diagram showing a process of obtaining a 90-degree rotated image according to the prior art method.

FIG. 3 is a diagram showing a process of obtaining a 90-degree rotated image according to another prior art method.

FIG. 4 is a block diagram of an apparatus for rotating an image according to a first embodiment of this invention.

FIG. 5 is a diagram showing a source image matrix in the first embodiment.

FIG. 6 is a diagram showing a process of obtaining a 90-degree rotated image according to the first embodiment.

FIG. 17 is a block diagram showing an operation of the apparatus FIG. 13.

FIGS. 21A and 21B are diagrams showing an operation of the third embodiment.

DESCRIPTION OF THE PRIOR ART

Figure 7:
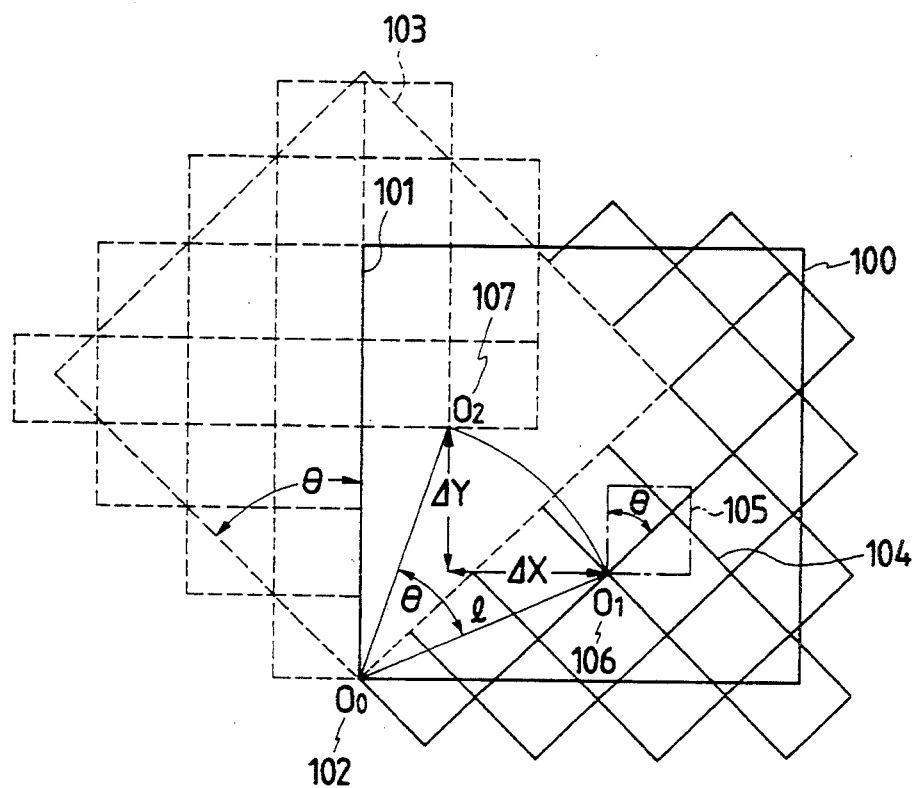
FIG. 7 is a diagram showing a basic operation of a second embodiment of this invention.

According to a first prior art method of rotating an image through 90 degrees, image data are represented by a matrix having N rows×N columns. It should be noted that the row is also referred to as a line. The first prior art method will be explained hereinafter with reference to FIGS. 1 and 2.

FIG. 1 shows an original image referred to as a source image which is represented by a matrix having 4 rows×4 columns. FIG. 2 shows different phases ph1-ph17 of the clockwise rotation of a matrix of 4 rows×4 columns through 90 degrees. Up to the phase ph16, the rows and the columns of the source image are exchanged, and a transposed matrix with respect to the source matrix is generated. At the phase ph17, bits of each row are exchanged with symmetrically-positioned bits while the center of the row is used as an axis of symmetry, so that a target image referred to as a destination image is obtained.

In the case of a memory having a normal structure, only a word (row) unit can be read out at once. Since the bits of the first word must be transferred to the respective rows, the following complicated process is required. Specifically, at the phase ph1, "0" is transferred to the first-column place within the first row. At the phase ph2, "1" is transferred to the first-column place within the second row. At the phase ph3, "2" is transferred to the first-column place within the third row. At the phase ph4, "3" is transferred to the first-column place within the fourth row. Then, the second word, the third word, and the fourth word are transferred by similar steps. Thus, the transfer of the 4 words requires 16 phases.

The prior art method of FIGS. 1 and 2 needs the sequential writing into the respective bit places of the destination image in unit of a bit. For example, to write "1" of the first word of the source image, the second word of the phase ph17 is read out and "1" is written into the fourth-column place. Therefore, there is a problem that the processing time tends to be long.

Japanese published unexamined patent application 62-111364 discloses a prior art image data rotating apparatus using a memory of such a special structure that the reading of data from the memory can be done in unit of either row or column. A second prior art method of rotating an image clockwise through 90 degrees which is executed by the prior art apparatus of Japanese application 62-111364 will be explained-hereinafter with reference to FIG. 3.

FIG. 3 shows different phases ph1–ph5 of the clockwise rotation of a matrix of 4 rows×4 columns through 90 degrees, where a source matrix is equal to the state of FIG. 1. At the phase ph5 of FIG. 3, a destination image matrix is obtained. The data "048C" in the first column is read out at once by access to the memory, and is written into the first word as shown in the phase ph1 of FIG. 3. Such access is done four times, so that a transposed matrix is obtained as shown in the phase ph4 of FIG. 3. At the phase ph5, bits of each row are exchanged with symmetrically-positioned bits while the center of the row is used as an axis of symmetry, so that a destination image is obtained. The prior art method of FIG. 3 enables high-speed data processing. However, in the prior art apparatus of Japanese application 62-111364, the use of the special-structure memory requires a large-scale circuit.

A third prior art method of rotating an image through an arbitrary angle will be explained hereinafter. The X coordinate and the Y coordinate of one pixel of a source image (an original image) are represented by $S_x$ and $S_y$ respectively. The rotation angle is represented by "a". The corresponding X coordinate and the corresponding Y coordinate of a destination image (a target image) which occurs after the rotation are represented by $D_x$ and $D_y$ respectively. In the third prior art method, the X coordinate $D_x$ and the Y coordinate $D_y$ of the destination image are calculated by referring to the following equations.

$D_x = S_x \cos a - S_y \sin a$ $D_y = S_x \sin a + S_y \cos a$

These calculated data are sequentially written into the corresponding places within the destination image in unit of bit.

According to the third prior art method, 4-time multiplication, twice addition, and sequential writing of data into corresponding places within a destination image in unit of bit are required per one pixel. Thus, the third prior art method has a problem that the calculation time tends to be long when a rotated image is large.

DESCRIPTION OF THE FIRST PREFERRED EMBODIMENT

With reference to FIG. 4, an apparatus for rotating an image through 90 degrees includes a CPU 1 and a main memory 2. The CPU 1 controls the whole of the apparatus. An image storing section 3 includes a cache memory. N-bit input latch circuits 4, 5, and 6 receive and latch N-bit row (word) data. A 2N-bit data conversion circuit 7 converts the words received by the N-bit input latch circuits 4 and 5, and outputs the resultant words. N-bit output latch circuits 8 and 9 latch the two words outputted from the 2N-bit data conversion circuit 7 respectively. A latch data selection circuit 10 selects one of the two data from the N-bit output latch circuits 8 and 9 in response to an output data selection signal fed from the CPU 1, and outputs the selected data. An N-bit exchange circuit 11 exchanges the bits of the word outputted from the N-bit input latch circuit 6, and outputs clockwise rotation data. A row order change circuit 12 changes the order of the row (word) outputted from the N-bit input latch circuit 6, and outputs counterclockwise rotation data. An N-bit output latch circuit 13 latches the outputs from the N-bit exchange circuit 11 and the row order change circuit 12, and outputs the latched data to the image storing section 3.

The operation of the apparatus of FIG. 4 will now be explained. FIG. 5 shows an original image referred to as a source image which is represented by a matrix having 4 rows×4 columns. FIG. 6 shows different phases ph1–ph6 of the rotation of a matrix of 4 rows×4 columns through 90 degrees.

The number M of conversion modes is equal to "n" when the size of a matrix is expressed as $2^n \times 2^n$. In the example of FIGS. 5 and 6, N=4 and N=$2^n$ so that n=2 and the conversion mode number M equals 2. Thus, there are two different conversion modes.

With respect to the two conversion modes, the operation of the 2N-bit data conversion circuit 7 will be explained hereinafter. The operation of the 2N-bit data conversion circuit 7 can be expressed as the below-mentioned conversion rules with respect to a 2N-bit data sequence corresponding to a conversion mode selection signal. When the data lines of the N-bit input latch circuit 4 are numbered as (0,1,2,3) and the data lines of the N-bit input latch circuit; 5 are numbered as (4,5,6,7), the conversion rules are given as:

| conversion mode 1 | | conversion mode 2 | |
|---|---|---|---|
| input | output | input | output |
| 0 → | 0 | 0 → | 0 |
| 1 → | 4 | 1 → | 1 |
| 2 → | 2 | 2 → | 4 |
| 3 → | 6 | 3 → | 5 |
| 4 → | 1 | 4 → | 2 |

-continued

| conversion mode 1 | | conversion mode 2 | |
| --- | --- | --- | --- |
| input | output | input | output |
| 5 → | 5 | 5 → | 3 |
| 6 → | 3 | 6 → | 6 |
| 7 → | 7 | 7 → | 7 |

In a transpositional notation:

| conversion mode 1 | (1, 4) | (3, 6) |
| --- | --- | --- |
| conversion mode 2 | (2, 4) | (3, 5) |

The overall operation of the apparatus of FIG. 4 will now be explained. The CPU 1 selects the conversion mode 1 of the conversion mode selection signal, and reads out the first word (0,1,2,3) from the image storing section 3 and transfers the first word to the N-bit input latch 4. Then, the CPU 1 transfers the second word (4,5,6,7) to the N-bit input latch circuit 5. The 2N-bit data conversion circuit 7 outputs (0,4,2,6) to the N-bit output latch circuit 8, and outputs (1,5,3,7) to the N-bit output latch circuit 9. The CPU 1 writes the contents (0,4,2,6) of the N-bit output latch circuit 8 into the first word of the image storing section 3. In addition, the CPU 1 writes the contents (1,5,3,7) of the N-bit output latch circuit 9 into the first word of the image storing section 3. This state corresponds to the phase ph1 of FIG. 6.

Similarly, the CPU 1 reads out the third word (8,9,A,B) from the image storing section 3 and transfers the third word to the N-bit input latch 4. Then, the CPU 1 transfers the fourth word (C,D,E,F) to the N-bit input latch circuit 5. The 2N-bit data conversion circuit 7 outputs (8,C,A,E) to the N-bit output latch circuit 8, and outputs (9,D,B,F) to the N-bit output latch circuit 9. The CPU 1 writes the contents (8,C,A,E) of the N-bit output latch circuit 8 into the third word of the image storing section 3. In addition, the CPU 1 writes the contents (9,D,B,F) of the N-bit output latch circuit 9 into the fourth word of the image storing section 3. This state corresponds to the phase ph2 of FIG. 6.

Then, the CPU 1 selects the conversion mode 2 of the conversion mode selection signal, and reads out the first word (0,4,2,6) from the image storing section 3 and transfers the first word to the N-bit input latch 4. Then, the CPU 1 transfers the third word (8,C,A,E) to the N-bit input latch circuit 5. The 2N-bit data conversion circuit 7 outputs (0,4,8,C) to the N-bit output latch circuit 8, and outputs (2,6,A,E) to the N-bit output latch circuit 9. The CPU 1 writes the contents (0,4,8,C) of the N-bit output latch circuit 8 into the first word of the image storing section 3. In addition, the CPU 1 writes the contents (2,6,A,E) of the N-bit output latch circuit 9 into the third word of the image storing section 3. This state corresponds to the phase ph3 of FIG. 6.

Similarly, the CPU 1 reads out the second word (1,5,3,7) from the image storing section 3 and transfers the second word to the N-bit input latch 4. Then, the CPU 1 transfers the fourth word (9,D,B,F) to the N-bit input latch circuit 5. The 2N-bit data conversion circuit 7 outputs (1,5,9,D) to the N-bit output latch circuit 8, and outputs (3,7,B,F) to the N-bit output latch circuit 9. The CPU 1 writes the contents (1,5,9,D) of the N-bit output latch circuit 8 into the second word of the image storing section 3. In addition, the CPU 1 writes the contents (3,7,B,F) of the N-bit output latch circuit 9 into the fourth word of the image storing section 3. This state corresponds to the phase ph4 of FIG. 6. The obtained matrix of the phase ph4 is equal to a transposed matrix with respect to the source image matrix of FIG. 5. As will be explained later, a clockwise rotation image and a counterclockwise rotation image are obtained from this transposed matrix.

First, a description will be given of the clockwise rotation image. After the transposed matrix of the phase ph4 is obtained, the CPU 1 reads out the first word (0,4,8,C) from the image storing section 3 and transfers the first word to the N-bit input latch circuit 6. The N-bit exchange circuit 11 executes an exchange between the LSB side and the MSB side of the data (0,4,8,C) of the N-bit input latch circuit 6, generating (C,8,4,0) and transferring (C,8,4,0) to the N-bit output latch circuit 13. The CPU 1 writes the contents (C,8,4,0) of the N-bit output latch circuit 13 into the first word of the image storing section 3.

Similarly, the CPU 1 reads out the second word (1,5,9,D) from the image storing section 3 and transfers the second word to the N-bit input latch circuit 6. The N-bit exchange circuit 11 executes an exchange between the LSB side and the MSB side of the data (1,5,9,D) of the N-bit input latch circuit 6, generating (D,9,5,1) and transferring (D,9,5,1) to the N-bit output latch circuit 13. The CPU 1 writes the contents (D,9,5,1) of the N-bit output latch circuit 13 into the second word of the image storing section 3.

Similarly, the CPU 1 reads out the third word (2,6,A,E) from the image storing section 3 and transfers the third word to the N-bit input latch circuit 6. The N-bit exchange circuit 11 executes an exchange between the LSB side and the MSB side of the data (2,6,A,E) of the N-bit input latch circuit 6, generating (E,A,6,2) and transferring (E,A,6,2) to the N-bit output latch circuit 13. The CPU 1 writes the contents (E,A,6,2) of the N-bit output latch circuit 13 into the third word of the image storing section 3.

Similarly, the CPU 1 reads out the fourth word (3,7,B,F) from the image storing section 3 and transfers the fourth word to the N-bit input latch circuit 6. The N-bit exchange circuit 11 executes an exchange between the LSB side and the MSB side of the data (3,7,B,F) of the N-bit input latch circuit 6, generating (F,B,7,3) and transferring (F,B,7,3) to the N-bit output latch circuit 13. The CPU 1 writes the contents (F,B,7,3) of the N-bit output latch circuit 13 into the fourth word of the image storing section 3. This state corresponds to the phase ph5 of FIG. 6 at which the destination image matrix is obtained.

Second, a description will be given of the counterclockwise rotation image. After the transposed matrix of the phase ph4 is obtained, the CPU 1 reads out the first word (0,4,8,C) from the image storing section 3 and transfers the first word to the N-bit input latch circuit 6. The row order change circuit 12 changes the data row order of the N-bit input latch circuit 6 to the fourth-word order, and writes the output data from the N-bit input latch circuit 12 into the fourth word of the image storing section 3 via the N-bit output latch circuit 13.

Next, the CPU 1 reads out the second word (1,5,9,D) from the image storing section 3 and transfers the second word to the N-bit input latch circuit 6. The row order change circuit 12 changes the data row order of the N-bit input latch circuit 6 to the third-word order, and writes the output data from the N-bit input latch circuit 12 into the third word of the image storing section 3 via the N-bit output latch circuit 13.

Similarly, the CPU 1 reads out the third word (2,6,A,E) from the image storing section 3 and transfers the third word to the N-bit input latch circuit 6. The row order change circuit 12 changes the data row order of the N-bit input latch circuit 6 to the second-word order, and writes the output data from the N-bit input latch circuit 12 into the second word of the image storing section 3 via the N-bit output latch circuit 13.

Similarly, the CPU 1 reads out the fourth word (3,7,B,F) from the image storing section 3 and transfers the fourth word to the N-bit input latch circuit 6. The row order change circuit 12 changes the data row order of the N-bit input latch circuit 6 to the first-word order, and writes the output data from the N-bit input latch circuit 12 into the first word of the image storing section 3 via the N-bit output latch circuit 13. This state corresponds to the phase ph6 of FIG. 6 at which the destination image matrix is obtained.

Next, a description will be given of a method of rotating a source image of N bits and N words (N rows×N columns) through 90 degrees. The conversion mode number M is determined by the size N of a matrix as expressed in the following equation.

$$M=[\log_2 N]$$

where when a numeral within a bracket "[ ]" is equal to an integer, the bracket denotes the integer; and when a numeral within the bracket contains a fraction, the bracket denotes an integer which is obtained by counting the fraction as one. In other words, M=n when $N=2^n$ ("n" denotes an integer), and M=n+1 when $2^n < N < 2^{n+1}$. Thus, the conversion mode number M represents that a matrix of N× N is handled as a matrix having a size of $2^M \times 2^M$. For example, a matrix of 5×5 is handled as a matrix of 8×8.

With respect to the conversion mode L (=1~M), the CPU 1 reads out the words (the rows) from the image storing section 3 and writes the words into the N-bit input latch circuits 4 and 5 by using the row numbers indicated below. The rows are numbered by 0~N−1 respectively. The number of the row transferred to the N-bit input latch circuit 4 is denoted by the character A, and the number of the row transferred to the N-bit input latch circuit 5 is denoted by the character B. The row numbers A and B are given as follows.

$$A = k*2^L \sim k*2^L + 2^{L-1} - 1$$

$$B = A + 2^{L-1}$$

$$k = 0 \sim (N/2^L) - 1$$

where the character "*" denotes an operator of product. The data of the rows having the numbers A and B are converted by the 2N-bit data conversion circuit 7 in a way as follows. The bit arrangement of the row having the number A is denoted by A(j), and the bit arrangement of the row having the number B is denoted by B(j) where j=0~N−1. The bit arrangements A(j) and B(j) are converted into bit arrangements A'(J) and B'(j) by referring to the following equations.

$$A'(j) = A(j)$$
$$j = k*2^L \sim k*2^L + 2^{L-1} - 1$$
$$A'(j) = B(j - 2^{L-1})$$
$$j = k*2^L + 2^{L-1} \sim k*2^L + 2^L - 1$$

-continued
$$B'(j) = B(j)$$
$$j = k*2^L + 2^{L-1} \sim k*2^L + 2^L - 1$$
$$B'(j) = A(j + 2^{L-1})$$
$$j = k*2^L \sim k*2^L + 2^{L-1} - 1$$
$$k = 0 \sim (N/2^L) - 1$$

The row data obtained by the conversion are latched by the N-bit output latch circuits 8 and 9, and are then written into the rows A and B of the image storing section 3 via the latch data selection circuit 10. These processes are reiterated for each of the conversion modes L varying from 1 to M, and therefore the transposed matrix with respect to the source image matrix is obtained.

A 90-degree clockwise-rotated image is derived from the transposed matrix as follows. The rows of the transposed matrix are sequentially read out from the image storing section 3, and are sequentially latched by the N-bit input latch circuit 6. The latched row is denoted by E(j). The N-bit exchange circuit 11 converts the bit arrangement of each row by referring to the following equation.

$$E(j) = E(N-J-1), j=0 \sim N-1$$

The resultant data are latched by the N-bit output latch circuit 13, and are then written into the image storing section 3. These processes are reiterated for each of the rows having the numbers of 0 to N−1, and therefore the destination image data of N rows×N columns is obtained.

A 90-degree counterclockwise-rotated image is derived from the transposed matrix as follows. The rows of the transposed matrix are sequentially read out from the image storing section 3, and are sequentially latched by the N-bit input latch circuit 6. The "i" row of the matrix is denoted by E(i,j). The row order change circuit 12 converts the row order by referring to the following equation.

$$E'(i,j) = E(N-i-1,j)$$

$$i = 0 \sim N-1$$

The resultant data are latched by the N-bit output latch circuit 13, and are then written into the image storing section 3. These processes are reiterated for each of the rows having the numbers of 0 to N−1, and therefore the destination image data of N rows×N columns is obtained.

DESCRIPTION OF THE SECOND PREFERRED EMBODIMENT

With reference to FIG. 7, a brief description will be given of a method of rotating an image through an arbitrary angle according to a second embodiment of this invention. A source image 100 is rotated about a reference point 102 on a reference coordinate axis 101 through an arbitrary angle θ, and thus a destination image 103 denoted by the broken lines is obtained.

The source image 100 is expressed by a group of reference blocks 104 which have N×N pixels and which are composed of squares having sides parallel to the axis corresponding to the rotation of the reference coordinate axis 101 through an angle of −θ.

Each of the reference blocks 104 is rotated about its one vertex 106 through an angle of θ, and is thereby converted into a rotation block 105.

Calculations are made on the shift quantities $\Delta Y$ and $\Delta X$ of the vertex 106 of each rotation block 105 which result from the rotation of the vertex 106 about the reference point 102 through an angle of $\theta$. The shift quantity $\Delta Y$ is defined as extending along the reference coordinate axis 101, and the shift quantity $\Delta X$ is defined as extending perpendicular to the reference coordinate axis 101. Then, each rotation block 105 is translated along the reference coordinate axis 101 by a distance equal to the shift quantity $\Delta Y$, and is also translated perpendicular to the reference coordinate axis 101 by a distance equal to the shift quantity $\Delta X$. As a result, the vertex 106 is moved to a point 107.

In this way, the reference blocks 104 are moved, and the resultant blocks compose the destination image 103. The angle $\theta$ of the rotation of the source image 100 can be set arbitrary.

Figure 8:
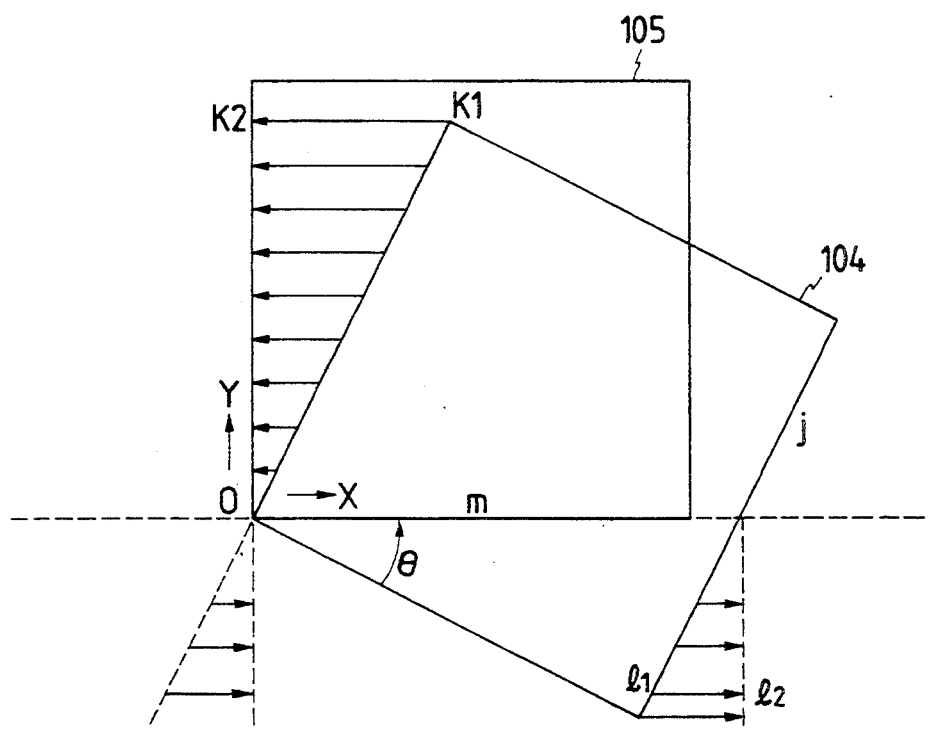
Figs. 8-12 are diagrams showing processes executed by the second embodiment.

With reference to FIGS. 8-12, a further description will be given of the generation of the rotation blocks 105 by rotating the reference blocks 104. As shown in FIG. 8, all the points within a square reference block 104 are moved in a manner such that points on the straight line $O_1$-K1 being one side of the reference block 104 will be shifted in a direction along the X axis to positions on the straight line $O_1$-K2. The coordinates (X,Y) of the resultant points are expressed as a function of the coordinates (x,y) of the arbitrary points within the reference block 104 as indicated by the following equation.

$$X, Y = x - y^* \text{TAN } \theta, y$$

where the character "$\theta$" denotes an angle of rotation, and the character "*" denotes an operator of product. As a result, the reference block 104 is transformed into a parallelogram A shown in FIG. 9.

Next, the parallelogram A is contracted in the direction of the X axis by shifting points within the parallelogram A in a manner such that the side m1 of the parallelogram A will overlap with the side m2 of the rotation block 105. The coordinates (X,Y) of the resultant points are given by the following equation.

$$\begin{aligned} X, Y &= (x - y^* \text{TAN}\theta)\text{COS}\theta, y \\ &= x^*\text{COS}\theta - y^*\text{SIN}\theta, y \end{aligned}$$

Figure 10:
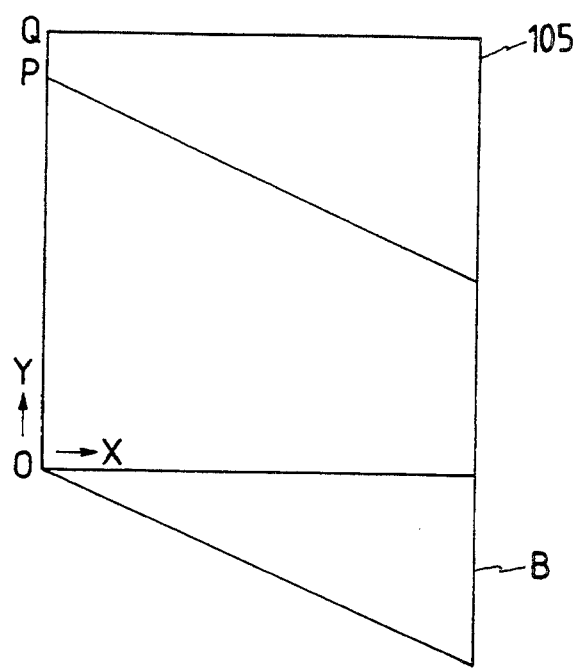

As a result, the parallelogram A is transformed into a parallelogram B shown in FIG. 10.

Subsequently, the parallelogram B is expanded in the direction of the Y axis in a manner such that the point P of the parallelogram B will be moved to the point Q. The coordinates (X,Y) of the resultant points are given by the following equation.

$$X, Y = x^* \text{COS } \theta - y^* \text{SIN } \theta, y/\text{COS } \theta$$

Figure 11:
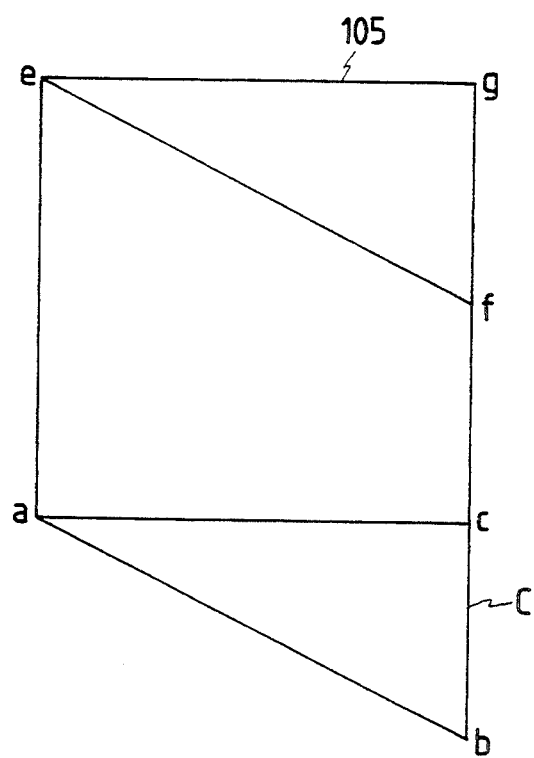

As a result, the parallelogram B is transformed into a parallelogram C shown in FIG. 11.

All points within the parallelogram C are shifted in the direction of the Y axis in a manner such that the points "b" and "f" will be moved to the points "c" and "g" respectively. Thus, the rotation to the position of the rotation block 105 is completed. The coordinates (X,Y) of the resultant points are given by the following equations.

$$X = x^* \text{COS } \theta - y^* \text{SIN } \theta$$

$$Y = x^* \text{SIN } \theta + y^* \text{COS } \theta$$

Figure 12:
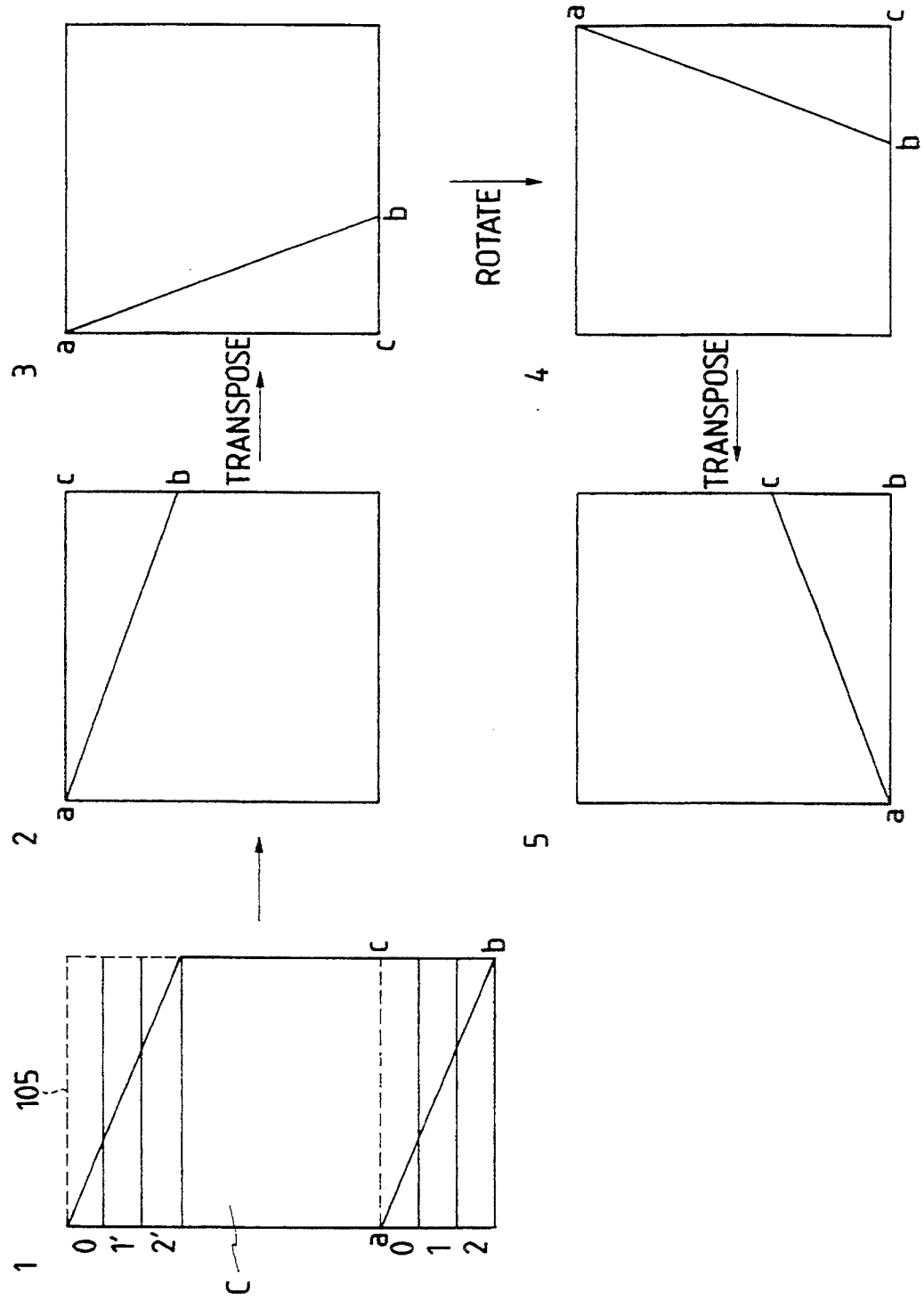

A further description will be given of the shift of the parallelogram C to the position of the rotation block 105 in the direction of the Y axis. In FIG. 12, the step 1 agrees with the state of FIG. 11. The triangle "abc" within the parallelogram C is moved upward. This movement is done in unit of row in a manner such that the "0" row will be moved to the "0'" row and the "2'" row will be moved to the "2'" row. This movement causes a matrix of a square form as shown in the step 2 of FIG. 12. Next, a transposed matrix with respect to the matrix of the step 2 is generated as shown in the step 3 of FIG. 12. In the step 3, the triangle "abc" is moved to the left-hand side. Next, a left-to-right rotational shift is done so that the triangle "abc" will be moved to the right-hand side as shown in the step 4 of FIG. 12. A transposed matrix with respect to the matrix of the step 4 is generated as shown in the step 5 of FIG. 12. The transposed matrix of the step 5 agrees with the rotation block 105. The position of the point "b" in the triangle "abc" of the step 4 is moved to the position of the point "c" of the triangle "abc" of the step 1.

The above-mentioned shift of the parallelogram C to the position of the rotation block 105 is quickly done by use of a memory of such a normal type that bits in the row direction (the X axis direction) can be read or written simultaneously in unit of word but reading and writing can be done only bit by bit in the column direction (the Y axis direction).

Figure 13:
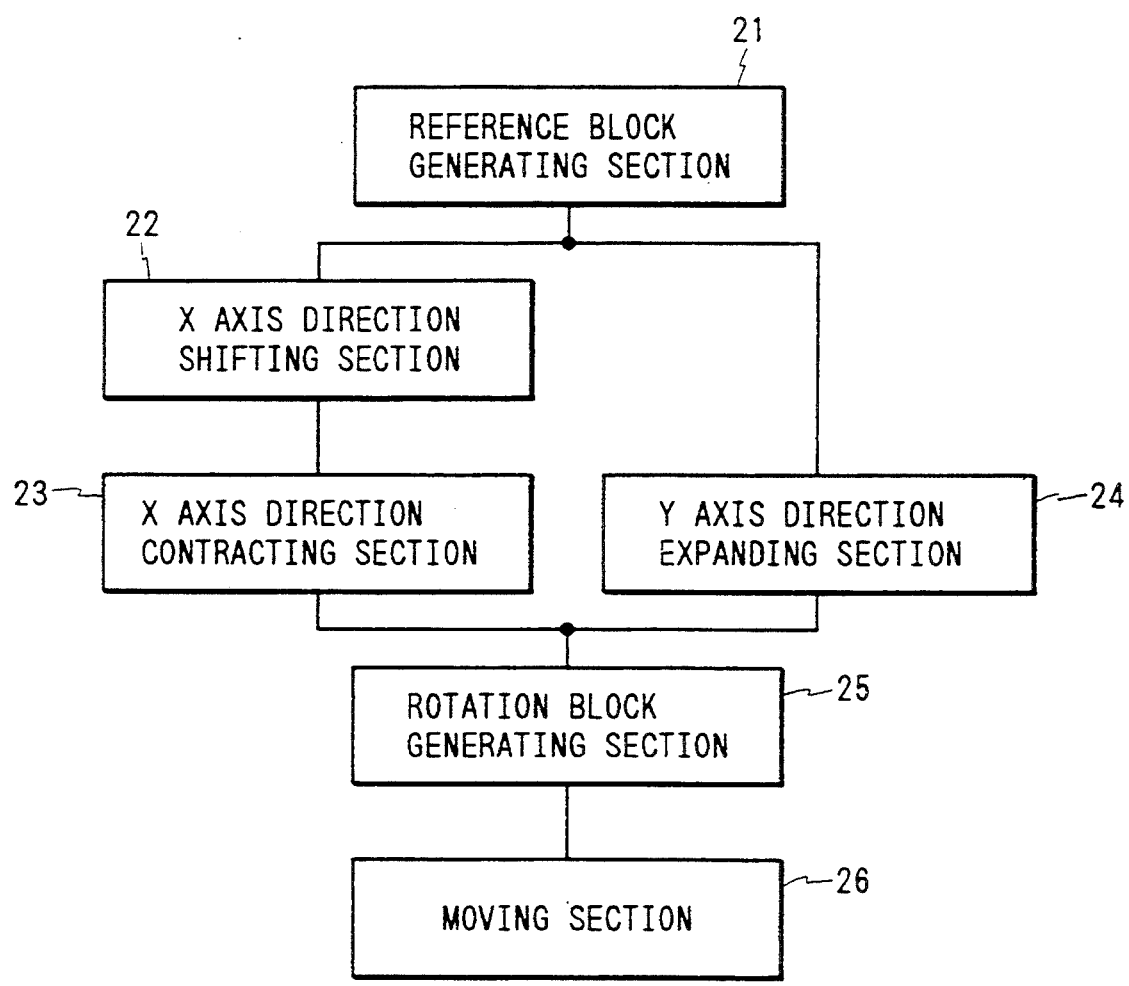
FIG. 13 is a block diagram of an apparatus for rotating an image according to the second embodiment.

The second embodiment will be further described. FIG. 13 shows an apparatus for rotating an image according to the second embodiment. As shown in FIG. 13, the apparatus includes a reference block generating section 21 which generates the reference blocks 104 composing the source image 100. The reference blocks 104 have N×N pixels and are composed of squares having sides parallel to the axis corresponding to the rotation of the reference coordinate axis 101 through an angle of $-\theta$. The angle $\theta$ is defined as being equal to an angle through which the source image 100 is rotated about the reference point 102 on the reference coordinate axis 101 to obtain the destination image 103.

An X axis direction shifting section 22 connected to the reference block generating section 21 executes the following processes. One of the vertexes of each reference block 104 is used as a center 106 of rotation. The axis which passes through the rotation center 106 and which extends parallel to the reference coordinate axis 101 is defined as the Y axis. The axis which passes through the rotation center 106 and which extends perpendicular to the Y axis is defined as the X axis. The X axis coordinates and the Y axis coordinates of the elements composing the reference block 104 are denoted by (x,y). As shown in FIG. 8, all the points within the square reference block 104 are moved in a manner such that the points on the straight line $O_1$-K1 being one side of the reference block 104 will be shifted in a direction along the X axis to the positions on the straight line $O_1$-K2. The coordinates (X,Y) of the resultant points are expressed as a function of the coordinates (x,y) of the arbitrary points within the reference block 104 as indicated by the following equation.

$$X, Y = x - y^* \text{TAN } \theta, y$$

where the character "θ" denotes an angle of rotation, and the character "*" denotes an operator of product. As a result, the reference block 104 is transformed into a parallelogram A shown in FIG. 9.

Figure 9:
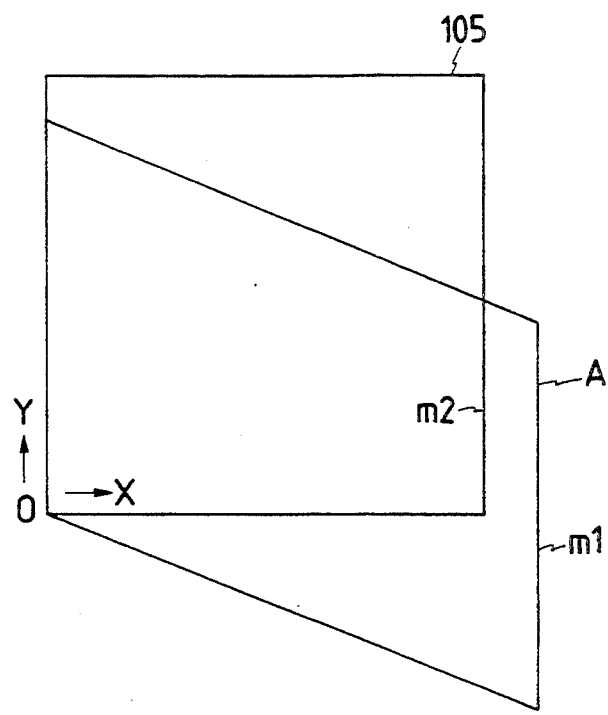

An X axis direction contracting section 23 connected to the X axis direction shifting section 22 contracts the parallelogram A of FIG. 9 into the parallelogram B of FIG. 10 in the direction of the X axis. The coordinates (X,Y) of the resultant points are given by the following equation.

$$X, Y = x^* \cos\theta - y^* \sin\theta, y$$

Figures 14, 15:
FIG. 14 is a diagram showing an operation of the contracting section of FIG. 13.
FIG. 15 is a diagram showing an operation of the expanding section of FIG. 13.

FIG. 14 shows an example of the contraction executed by the X axis direction contracting section 23. In FIG. 14, the factor of the contraction is equal to ⅔, and 9-bit source row data is thinned to 6-bit row data.

A Y axis direction expanding section 24 connected to the sections 21 and 23 expands the parallelogram B of FIG. 10 into the parallelogram C of FIG. 11 in the direction of the Y axis. The coordinates (X,Y) of the resultant points are given by the following equation.

$$X, Y = x^* \cos\theta - y^* \sin\theta, y/\cos\theta$$

FIG. 15 shows an example of the expansion executed by the Y axis direction expanding section 24. In FIG. 15, the factor of the expansion is equal to 1.5, and the "0" line and the "2" lines are added to the four source data lines to form a 6-line data.

A rotation block generating section 25 connected to the sections 23 and 24 generates each rotation block 105 by shifting the columns of the matrix in the direction of the Y axis which forms the parallelogram C of FIG. 11. A detailed description of the rotation block generating section 25 will be given later.

A moving section 26 connected to the rotation block generating section 25 executes the following processes. The calculations are made on the shift quantities ΔY and ΔX of the vertex 106 of each rotation block 105 which result from the rotation of the vertex 106 about the reference point 102 through an angle of θ. The shift quantity ΔY is defined as extending along the reference coordinate axis 101, and the shift quantity ΔX is defined as extending perpendicular to the reference coordinate axis 101. Then, each rotation block 105 is translated along the reference coordinate axis 101 by a distance equal to the shift quantity ΔY, and is also translated perpendicular to the reference coordinate axis 101 by a distance equal to the shift quantity ΔX. The moving section 26 generates data which represents the destination image 103 obtained by the rotation of the source image 100 through the angle θ.

The rotation block generating section 25 will be further described. As shown in FIG. FIG. 16, the rotation block generating section 25 includes a matrix generating section 51, a transposed matrix generating section 52, and a rotating section 53.

Figure 17:
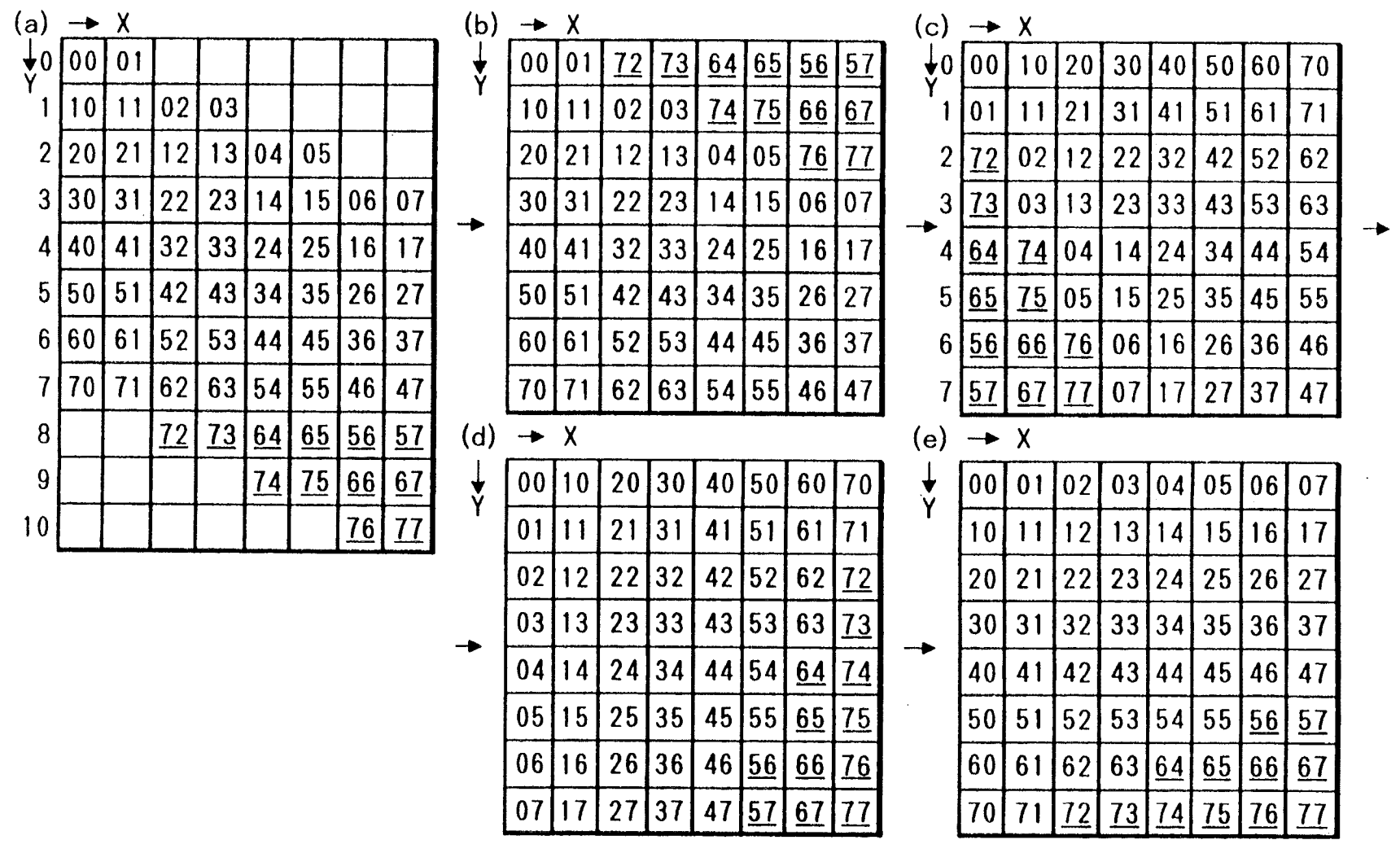

As shown in FIG. 11, the parallelogram C has the triangle "abc" extending outward of the rotation block 105. The matrix generating section 51 reads out data from the triangle "abc" for each of the row bit arrangements parallel to the X axis, and writes the data into the corresponding triangle "efg" within the rotation block 105. The parts (a) and (b) of FIG. 17 show an example of the operation of the matrix generating section 51. The part (a) of FIG. 17 shows a matrix corresponding to the parallelogram C of FIG. 11. In the part (a) of FIG. 17, underlined bits compose the triangle "abc" within the parallelogram C which extends outward of the rotation block 105. The matrix of the part (a) of FIG. 17 is processed in the sequential steps 1–3 as follows.

1. The data (... 72 73 64 65 56 57) of the "8" line are read out. The data (00 01 ...) of the "0" line into which the data of the "8" line should be written are read out. The OR operation between the data of the "8" line and the data of the "0" line is executed. The data which result from the OR operation are written into the "0" line.

2. The data (... 74 75 66 67) of the "9" line are read out. The data (10 11 02 03 ...) of the "1" line into which the data of the "9" line should be written are read out. The OR operation between the data of the "9" line and the data of the "1" line is executed. The data which result from the OR operation are written into the "1" line.

3. The data (... 76 77) of the "10" line are read out. The data (20 21 12 13 04 05 ...)of the "2" line into which the data of the "10" line should be written are read out. The OR operation between the data of the "10" line and the data of the "2" line is executed. The data which result from the OR operation are written into the "2" line. As a result of the above-mentioned steps 1–3, the matrix of the part (b) of FIG. 17 is obtained.

Figure 16:
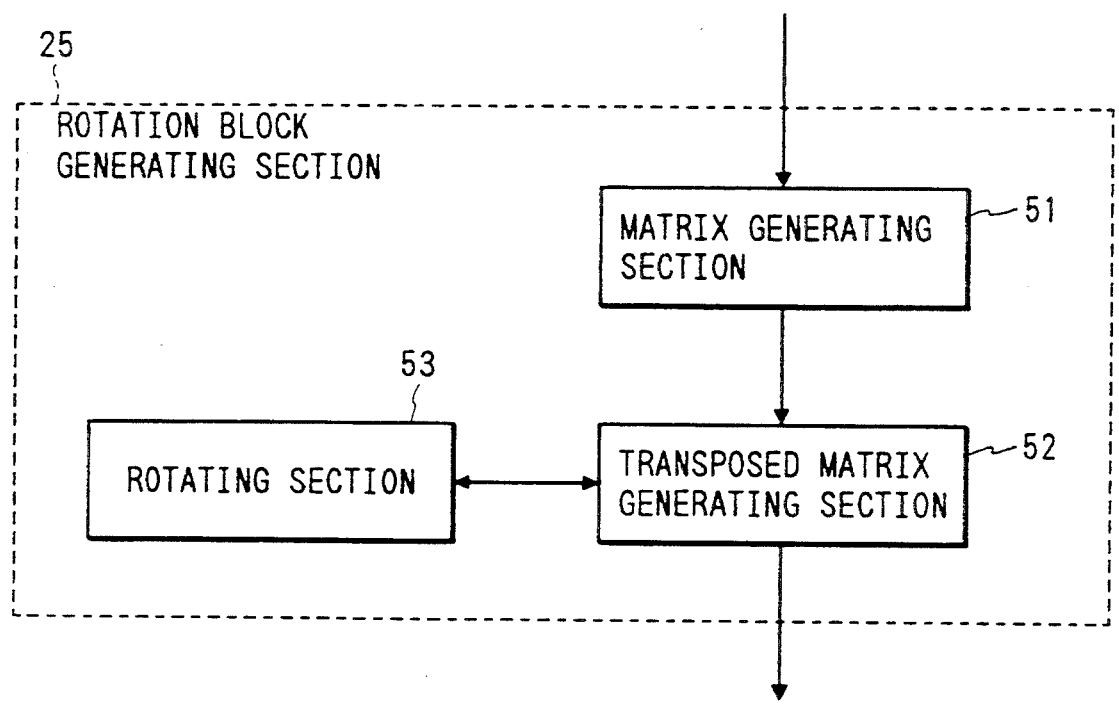
FIG. 16 is a block diagram of the rotation block generating section of FIG. 18.

As shown in FIG. 16, the transposed matrix generating section 52 is connected to the matrix generating section 51. The transposed matrix generating section 52 generates the transposed matrix with respect to the matrix of the part (b) of FIG. 17. The transposed matrix is shown in the part (c) of FIG. 17. The generation of the transposed matrix will be further described later.

As shown in FIG. 16, the rotating section 53 is connected to the transposed matrix generating section 52. With respect to the rows having the underlined bits, the rotating section 53 executes and reiterates the left-to-right rotation until all the underlined bits are moved to the right-hand side. As a result; a matrix shown in the part (d) of FIG. 17 is obtained. Specifically, the rotation section 53 executes the rotation through the sequential steps 1–3 as follows.

1. The data (72 02 12 22 32 42 52 62) of the "2" line are read out. The left-to-right rotation is executed by one bit which corresponds to the number of the underlined bit. The resultant data (02 12 22 32 42 52 62 72) are written into the "2" line.

2. The data (73 03 13 23 33 43 53 63) of the "3" line are read out. The left-to-right rotation is executed by one bit which corresponds to the number of the underlined bit. The resultant data (03 13 23 33 43 53 63 73.) are written into the "3" line. A similar process is done for each of the "4" line, the "5" line, and the "6" line.

3. The data (57 67 77 07 17 27 37 47) of the "7" line are read out. The left-to-right rotation is executed by three bits which correspond to the number of the underlined bits. The resultant data (07 17 27 37 47 57 67 77) are written into the "7" line.

The transposed matrix generating section 52 generates the transposed matrix with respect to the matrix of the part (d) of FIG. 17. The transposed matrix is shown in the part (e) of FIG. 17. The matrix of the part (e) of FIG. 17 is obtained by shifting the columns of the matrix of the part (a) of FIG. 17 in the direction of the Y axis. The matrix of the part (e) of FIG. 17 corresponds to the rotation block 105.

Figure 18:
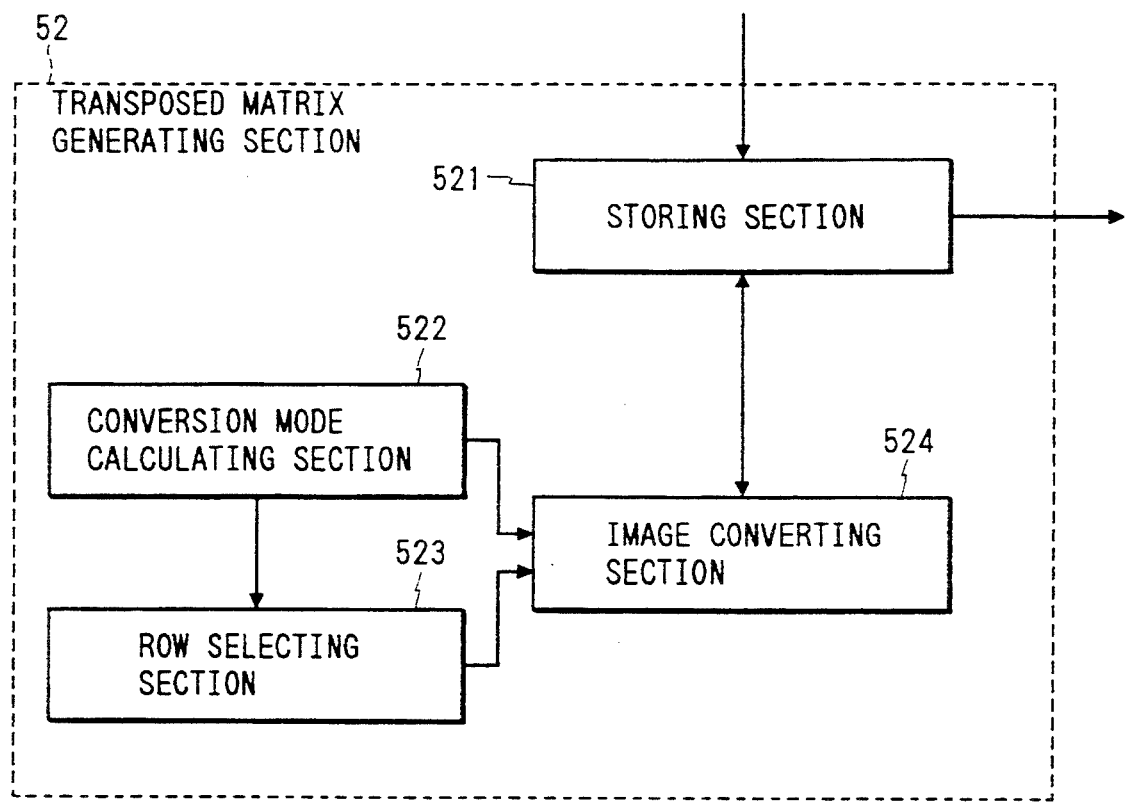
FIG. 18 is a block diagram of the transposed matrix generating section of FIG. 16.

The generation of the transposed matrix which is executed by the transposed matrix generating section 52 will now be further described. As shown in FIG. 18, the transposed matrix generating section 52 includes an image data storing section 521, a conversion mode calculating section 522, a row selecting section 523, and an image converting section 524.

The image data storing section 521 stores the image data. The conversion mode calculating section 522 is connected to the image data storing section 521. In the case where image data of N rows×N columns are stored in the image data storing section 521, the conversion mode calculating section 522 calculates the conversion mode number M by referring to the following equation.

$$M = [\log_2 N]$$

where when a numeral within a bracket "[ ]" is equal to an integer, the bracket denotes the integer; and when a numeral within the bracket contains a fraction, the bracket denotes an integer which is obtained by counting the fraction as one. In other words, $M=n$ when $N=2^n$ ("n" denotes an integer), and $M=n+1$ when $2^n < N < 2^{n+1}$. After the calculation of the conversion mode number M, the conversion mode calculating section 522 outputs the value of the conversion mode L which varies from 1 to M.

The row selecting section 523 is connected to the conversion mode calculating section 522. The row selecting section 523 numbers the rows of the matrix of the N rows×N columns by $0 \sim N-1$ in response to the value of the conversion mode L outputted from the conversion mode calculating section 522. The row selecting section 523 determines the numbers A and B of rows among the N rows according to the following equations.

$$A = k*2^L \sim k*2^L + 2^{L-1} - 1$$

$$B = A + 2^{L-1}$$

$$k = 0 \sim (N/2^L) - 1$$

where the character "*" denotes an operator of product. The row selecting section 523 selects the bit arrangements A(j) and B(j) of the rows having the numbers A and B respectively, where $J = 0 \sim N-1$.

The image converting section 524 is connected to the sections 521–523. The image converting section 524 receives the bit arrangements A(j) and B(J), and derives new bit arrangements A'(J) and B'(J) by referring to the following equations.

$$A'(j) = A(j)$$
$$j = k*2^L \sim k*2^L + 2^{L-1} - 1$$
$$A'(j) = B(j - 2^{L-1})$$
$$j = k*2^L + 2^{L-1} \sim k*2^L + 2^L - 1$$
$$B'(j) = B(j)$$
$$j = k*2^L + 2^{L-1} \sim k*2^L + 2^L - 1$$
$$B'(j) = A(j + 2^{L-1})$$
$$j = k*2^L \sim k*2^L + 2^{L-1} - 1$$
$$k = 0 \sim (N/2^L) - 1$$

In this way, the image converting section 524 converts the image data A(j) and B(j) into the new image data A'(j) and B'(j). These processes are reiterated for each of the conversion modes L varying from 1 to M, and therefore the transposed matrix of N rows×N columns is obtained.

DESCRIPTION OF THE THIRD PREFERRED EMBODIMENT

A third embodiment of this invention is similar to the embodiment of FIGS. 7–18 except for design changes indicated hereinafter.

Figure 19:
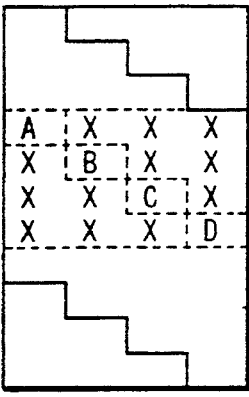
FIG. 19 is a diagram showing a process executed by a third embodiment of this invention.

In the third embodiment, the shift of the parallelogram C to the position of the rotation block 105 in the direction of the Y axis (see FIG. 12) is executed as follows. The matrix corresponding to the parallelogram C is processed into a square-form matrix corresponding to the rotation block 105. During this process, as shown in FIG. 19, the data "A x x x" of the "k" line are converted into the data "ABCD". Specifically, in the step 1 of FIG. 19, the matrix corresponding to the parallelogram C is processed by use of a mask 1 extending from the "k" row to a given row. The mask 1 is determined by the size of the triangle "abc" of the parallelogram C of FIG. 11. As a result of this process, a matrix shown in the right-hand end of the step 1 of FIG. 19 is obtained. During the next step 2 of FIG. 19, the "(k+1)'" row is covered with a mask 2, and a row shown in the right-hand end of the step 2 of FIG. 19 is obtained. In the step 3 of FIG. 19, the OR operation between the "k'38 row and the row obtained by the step 2 is executed so that a row shown in the right-hand end of the step 3 of FIG. 19 is obtained. During the next step 4 of FIG. 19, the "(k+2)'" row is covered with a mask 3, and a row shown in the right-hand end of the step 4 of FIG. 19 is obtained. In the step 5 of FIG. 19, the OR operation between the rows obtained by the steps 3 and 4 is executed so that a row shown in the right-hand end of the step 5 of FIG. 19 is obtained. During the next step 6 of FIG. 19, the "(k+3)'" row is covered with a mask 4, and a row shown in the right-hand end of the step 6 of FIG. 19 is obtained. In the step 7 of FIG. 19, the OR operation between the rows obtained by the steps 5 and 6 is executed so that a row shown in the right-hand end of the step 7 of FIG. 19 is obtained. Thus, the row "ABCD" is obtained. Such processes are executed for each of the rows, and thereby the matrix corresponding to the rotation block 105 is obtained.

Figure 20:
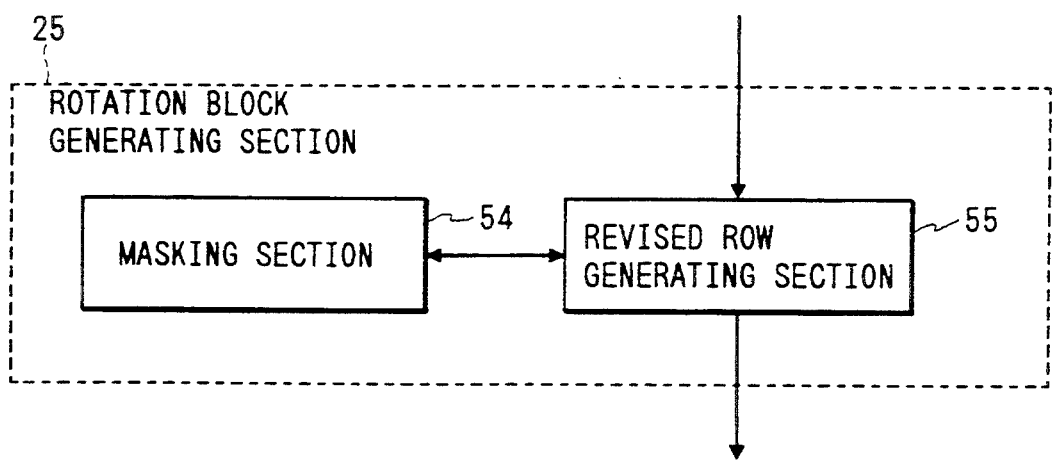
FIG. 20 is a block diagram of a rotation block generating section in the third embodiment.

In the third embodiment, as shown in FIG. 20, the rotation block generating section 25 includes a masking section 54 and a revised row generating section 55. In the case where the triangle "abc" of the parallelogram C of FIG. 11 is composed of "n" rows having bit arrangements parallel to the X axis and where the rotation block 105 is composed of N rows×N columns, the masking section 54 numbers the rows of the parallelogram C by $0 \sim n+N-1$ and generates a mask matrix of n+1 rows×N columns. The mask matrix has a part corresponding to the triangle "abc". This part of the mask matrix is "0", and the remaining part of the mask matrix is "1". The masking section 54 executes the AND operation between the mask matrix and the part of the parallelogram C which has the n+1 rows×N columns and which extends between the "k" row and the "k+n" row. The AND operation generates a matrix including a "k'" row to a "(k+n)'" row.

Figure 21A:
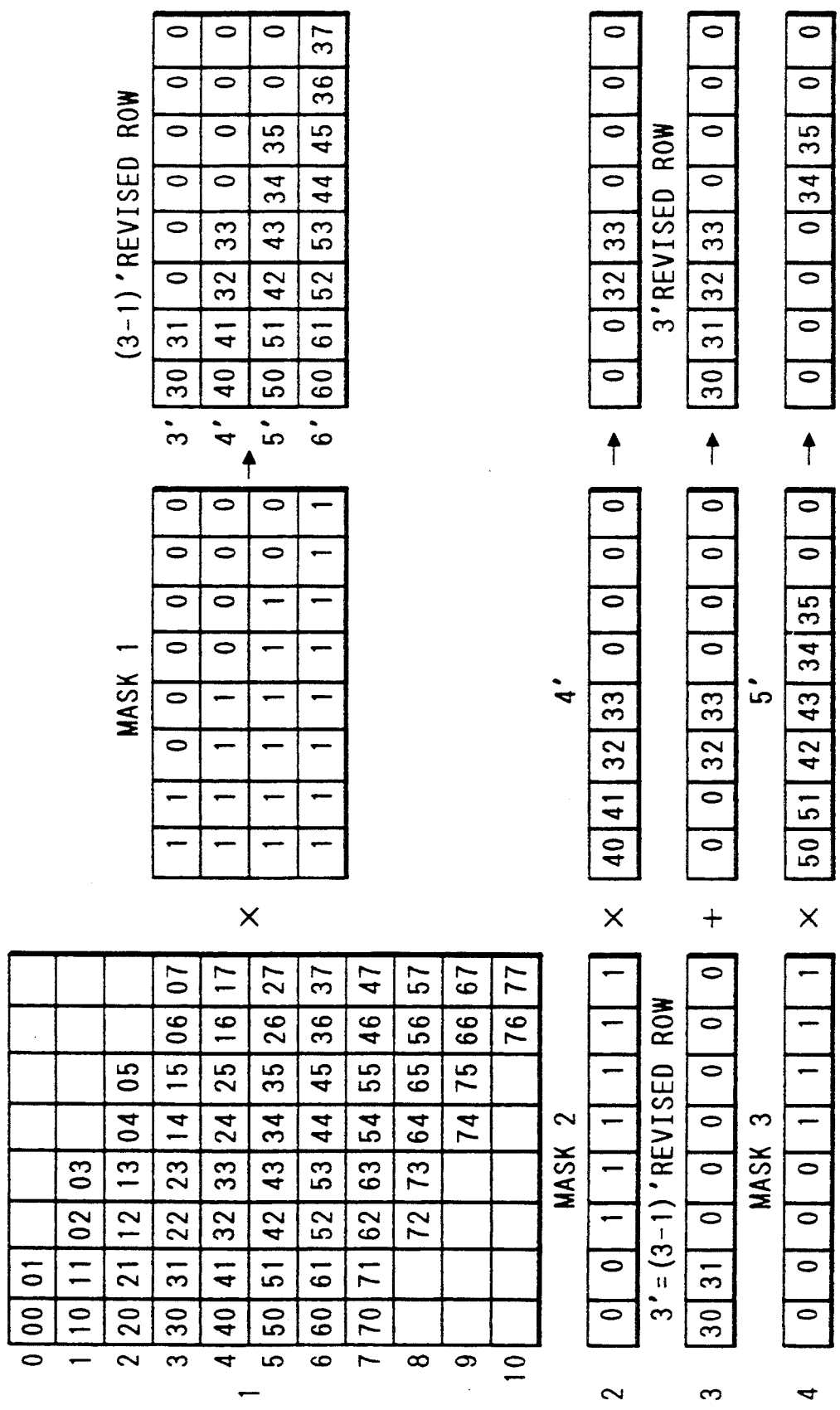

The step 1 of FIG. 21A shows an example of the processing executed by the masking section 54. In the step 1 of FIG., 21A, the left-hand matrix corresponds to the parallelogram C of FIG. 11. The rotation block 105 corresponds to a matrix of 8 rows×8 columns, and the triangle "abc" corresponds to a matrix of 3 rows×8 columns. Thus, the mask matrix has 4 rows×8 columns as shown by the mask 1 in the step 1 of FIG. 21A. The mask 1 is applied to the part of the parallelogram C which extends between the "3'" row and the "6'" row. As a result, the right-hand matrix of 4 rows×8 columns is obtained. The part of the right-hand matrix which corresponds to the triangle "abc" is "0".

The revised row generating section 55 masks the part of the "(k+1)'" row which corresponds to the part of the revised "(k−1)'" row where the bits differ from "0". The revised "(k−1)'" row is equal to the "k'" row. The revised row generating section 55 sets the masked part of the "(k+1)'" row equal to "0". Then, the revised row generating section 55 executes the OR operation between the masked row and the revised "(k−1)'" row, and thereby calculates the revised "k'" row. The revised row generating section 55 calculates the revised "(k+n−1)'" row by use of the revised "k'" row, and defines the revised "(k+n−1)'" row as a "k" row. Such processes are reiterated, determining the "0" row to the "N−1" row and generating the matrix of N rows×N columns which corresponds to the rotation block 105.

Figure 21B:
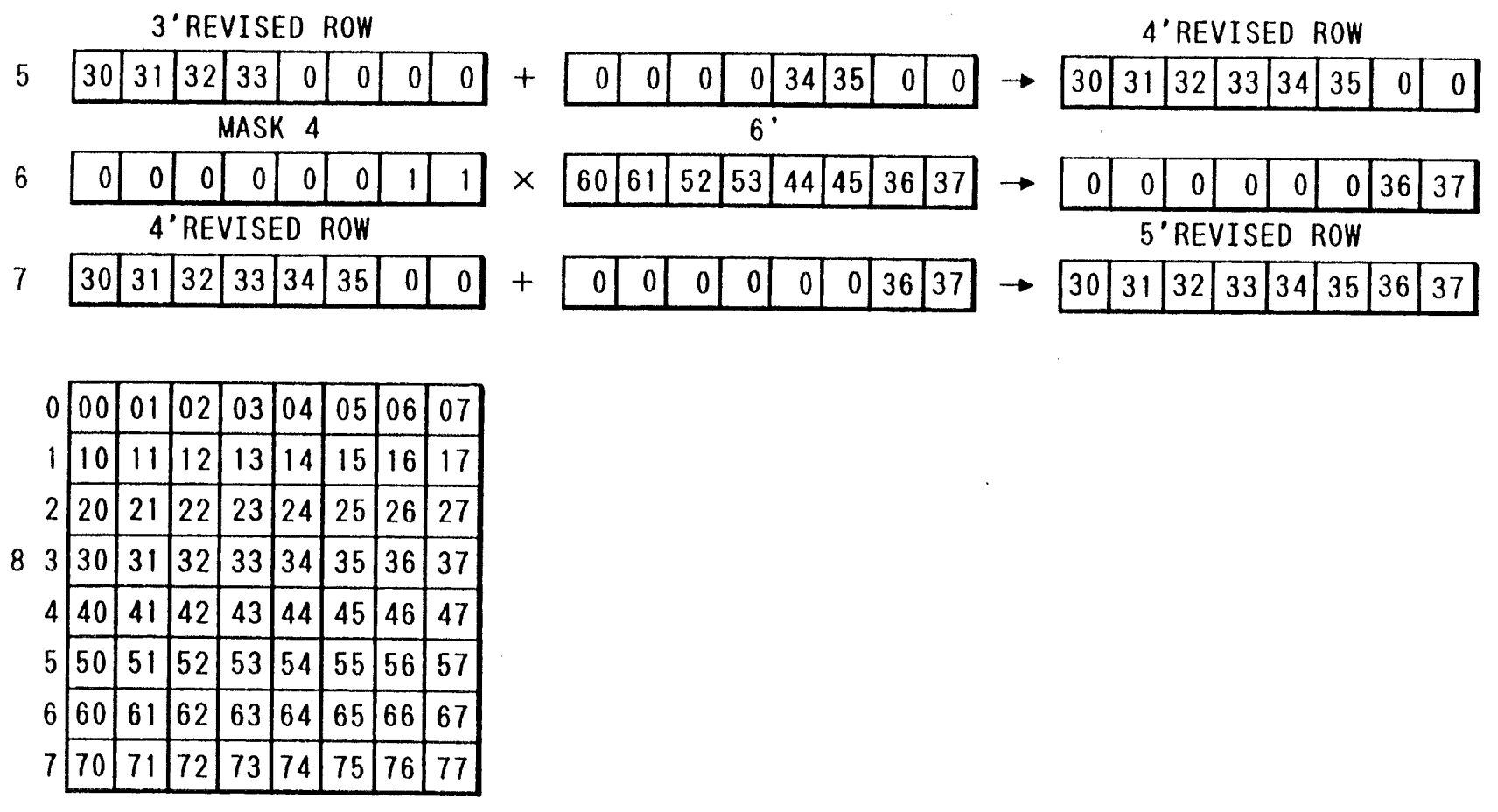

The steps 2–4 of FIG. 21A and the steps 5–8 of FIG. 21B show an example of the processing executed by the revised row generating section 55. In the step 2 of FIG. 21A, the mask 2 is separated into a first part and a second part equal to "0" and "1" respectively. The first part of the mask 2 corresponds to the part of the revised "(3-1)'" row where the bits differ from "0". In the step 2 of FIG. 21A, the mask 2 is applied to the "4'" row; generating the right-hand row. In the step 3 of FIG. 21A, the OR operation is executed between the revised "(3-1)'" row and the row obtained by the step 2, so that the revised "3'" row is obtained. In the step 4 of FIG. 21A, the mask 3 is separated into a first part and a second part equal to "0" and "1" respectively. The first part of the mask 3 corresponds to the part of the revised "3'" row where the bits differ from "0". In the step 4 of FIG. 21A, the mask 3 is applied to the "5'" row, generating the right-hand row. In the step 5 of FIG. 21B, the OR operation is executed between the revised "3'" row and the row obtained by the step 4, so that the revised "4'" row is obtained. In the step 6 of FIG. 21B, the mask 4 is separated into a first part and a second part equal to "0" and "1" respectively. The first part of the mask 4 corresponds to the part of the revised "4'" row where the bits differ from "0". In the step 6 of FIG. 21B, the mask 4 is applied to the "6'" row, generating the right-hand row. In the step 7 of FIG. 21B, the OR operation is executed between the revised "4'" row and the row obtained by the step 6, so that the revised row is obtained. The revised "5'" row is defined as the "3'" row shown in the step 1 of FIG. 21A. Such processes are executed for each of the "0" row to the "N−1" row of the step 1 of FIG. 21A, so that the matrix of 8 rows×8 columns shown in the step 8 of FIG. 21B is obtained. The matrix in the step 8 of FIG. 21B corresponds to the rotation block 105.

What is claimed is:

1. A method of rotating a reproduced video image by an apparatus including a central processing unit (cpu), a main memory, an image storing memory for storing image data in rows, a plurality of input latches, a plurality of output latches, a data conversion circuit, an exchange circuit, a row order change circuit and a selection circuit with said plurality of input latches connected to said cpu, said main memory and said image storing memory, said data conversion circuit connected between a predetermined number of input latches and output latches, said exchange circuit and said row order change circuit connected between an input latch and an output latch, and said selection circuit connected to said predetermined number of output latches connected to said data conversion circuit, comprising the steps of:

calculating a conversion mode number M with respect to image data of N rows×N columns by referring to an equation expressed as: $M=[\log_2 N]$ where N is a power of 2 and when a numeral within a bracket "[ ]" is equal to an integer, the bracket denotes the integer; and when a numeral within the bracket contains a fraction, the bracket denotes an integer which is obtained by counting the fraction as one, said step of calculating a conversion including a step of reading out the N rows of image data from the image storing memory;

numbering the N rows by $0 \sim N-1$ and transferring the rows to the plurality of input latches;

calculating rows having numbers A and B for each of conversion modes L $(=1 \sim M)$ by referring to equations expressed as:

$$A = k*2^L \sim k*2^L + 2^{L-1} - 1$$

$$B = A + 2^{L-1}$$

$$k = 0 \sim (N/2^L) - 1$$

where a character "*" denotes an operator of product;

representing row bit arrangements of the rows having the numbers A and B by A(j) and B(j) respectively;

converting the row bit arrangements A(j) and B(j) into bit arrangements A'(j) and B'(j) with said data conversion circuit by referring to equations expressed as:

$$\begin{aligned}
A'(j) &= A(j) \\
j &= k*2^L \sim k*2^L + 2^{L-1} - 1 \\
A'(j) &= B(j - 2^{L-1}) \\
j &= k*2^L + 2^{L-1} \sim k*2^L + 2^L - 1 \\
B'(j) &= B(j) \\
j &= k*2^L + 2^{L-1} \sim k*2^L + 2^L - 1 \\
B'(j) &= A(j + 2^{L-1}) \\
j &= k*2^L \sim k*2^L + 2^{L-1} - 1 \\
k &= 0 \sim (N/2^L) - 1
\end{aligned}$$

latching the row data obtained by the step of converting in said plurality of output latches;

writing the latched row data into said image storing memory via said selection circuit;

varying L from 1 to M and thereby deriving conversion image data of N rows×N columns;

representing bit arrangements of rows of the conversion image data by E(j); and converting the bit arrangements of the rows of the conversion image data by referring to equations expressed as:

$$F(j) = E(N-j-1), j = 0 \sim N-1$$

where F(j) denotes rows composing 90-degree clockwise-rotated image data of N rows×N columns.

2. A method of rotating a reproduced video image by an apparatus including a central processing unit (cpu), a main memory, an image storing memory for storing image data in rows, a plurality of input latches, a plurality of output latches, a data conversion circuit, an exchange circuit, a row order change circuit and a selection circuit with said plurality of input latches connected to said cpu, said main memory and said image storing memory, said data conversion circuit connected between a predetermined number of input latches and output latches, said exchange circuit and said row order change circuit connected between an input latch and an output latch, and said selection circuit connected to said predetermined number of output latches connected to said data conversion circuit, comprising the steps of:

calculating a conversion mode number M with respect to image data of N rows×N columns by referring to an equation expressed as: M=[log$_2$N] where when a numeral within a bracket "[ ]" is equal to an integer, the bracket denotes the integer; and when a numeral within the bracket contains a fraction, the bracket denotes an integer which is obtained by counting the fraction as one, said step of calculating a conversion including a step of reading out the N rows of image data from the image storing memory;

numbering the N rows by 0~N−1 and transferring the rows to the plurality of input latches;

calculating rows having numbers A and B for each of conversion modes L (=1~M) by referring to equations expressed as:

$$A = k*2^L \sim k*2^L + 2^{L-1} - 1$$

$$B = A + 2^{L-1}$$

$$k = 0 \sim (N/2^L) - 1$$

where a character "*" denotes an operator of product:

representing row bit arrangements of the rows having the number A and B by A(j) and B(j) respectively;

converting the row bit arrangements A(j) and B(j) into bit arrangements A'(j) and B'(j) by referring to equations expressed as:

$$A'(j) = A(j)$$
$$j = k*2^L \sim k*2^L + 2^{L-1} - 1$$
$$A'(j) = B(j - 2^{L-1})$$
$$j = k*2^L + 2^{L-1} \sim k*2^L + 2^L - 1$$
$$B'(j) = B(j)$$
$$j = k*2^L + 2^{L-1} \sim k*2^L + 2^L - 1$$
$$B'(j) = A(j + 2^{L-1})$$
$$j = k*2^L \sim k*2^L + 2^{L-1} - 1$$
$$k = 0 \sim (N/2^L) - 1$$

latching the row data obtained by the step of converting in said plurality of output latches;

writing the latched row data into said image storing memory via said selection circuit;

varying L from 1 to M and thereby deriving conversion image data of N rows×N columns;

representing an "i" row of the conversion image data by E(i,j); and changing the rows of the conversion image data by referring to equations expressed as:

$$E'(i,j) = E(N-i-1, j), i = 0 \sim N-1$$

where E'(i,j) denotes rows composing 90-degree counterclockwise-rotated image data of N rows×N columns.

3. An apparatus for rotating a reproduced video image through 90 degrees, comprising:
a central processing unit (CPU);
a main memory;
an image storing memory;
a plurality of input latches;
a plurality of output latches;
a data conversion circuit;
an exchange circuit;
a row order change circuit; and
a selection circuit, said plurality of input latches connected to said CPU, said main memory and said image storing memory, said data conversion circuit connected between a predetermined number of input latches and output latches, said exchange circuit and said row order change circuit connected between an input latch and an output latch, and said selection circuit connected to said predetermined number of output latches connected to said data conversion circuit; wherein said CPU includes means for calculating a conversion mode number M with respect to image data of N rows×N columns by referring to an equation expressed as: M=[log$_2$N] where when a numeral within a bracket "[ ]" is equal to an integer, the bracket denotes the integer; and when a numeral within the bracket contains a fraction, the bracket denotes an integer which is obtained by counting the fraction as one, means for numbering the N rows by 0~N−1, and means for calculating rows having numbers A and B for each of conversion modes L (=1~M) by referring to equations expressed as:

$$A = k*2^L \sim k*2^L + 2^{L-1} - 1$$

$$B = A + 2^{L-1}$$

$$k = 0 \sim (N/2^L) - 1$$

where a character "*" denotes an operator of product;

said data conversion circuit includes means for representing row bit arrangements of the rows having the numbers A and B by A(j) and B(j) respectively;

means for converting the row bit arrangements A(j) and B(j) into bit arrangements A'(j) and B'(j) by referring to equations expressed as:

$$A'(j) = A(j)$$
$$j = k*2^L \sim k*2^L + 2^{L-1} - 1$$
$$A'(j) = B(j - 2^{L-1})$$
$$j = k*2^L + 2^{L-1} \sim k*2^L + 2^L - 1$$
$$B'(j) = B(j)$$
$$j = k*2^L + 2^{L-1} \sim k*2^L + 2^L - 1$$
$$B'(j) = A(j + 2^{L-1})$$
$$j = k*2^L \sim k*2^L + 2^{L-1} - 1$$
$$k = 0 \sim (N/2^L) - 1$$

said CPU varying L from 1 to M and thereby deriving conversion image data of N rows×N columns;

said exchange circuit includes means for representing bit arrangements of rows of the conversion image data by E(j), and means for converting the bit arrangements of the rows of the conversion image data by referring to equations expressed as:

$$F(j) = E(N-j-1), j = 0 \sim N-1$$

where F(j) denotes rows composing 90-degree clockwise-rotated image data of N rows×N columns; and said row order change circuit includes means for representing an "i" row of the conversion image data by E(i,j), and means for changing the rows of the conversion image data by referring to equations expressed as:

$E'(i,j)=E(N-i-1,j)$, $i=0 \sim N-1$ where $E'(i,j)$ denotes rows composing 90-degree counterclockwise-rotated image data of N rows×N columns.

4. A method of rotating a reproduced video image by an apparatus including a central processing unit (cpu), a main memory, an image storing memory, a plurality of input latches, a plurality of output latches, a data conversion circuit, an exchange circuit, a row order change circuit and a selection circuit with said plurality of input latches connected to said cpu, said main memory and said image storing memory, said data conversion circuit connected between a predetermined number of input latches and output latches, said exchange circuit and said row order change circuit connected between an input latch and an output latch, and said selection circuit connected to said predetermined number of output latches connected to said data conversion circuit, comprising the steps of:

representing the source image by a group of reference blocks, wherein each of the reference blocks has N×N pixels and is composed of a square having a side parallel to an axis which is rotated relative to the reference coordinate axis by an angle of $-\theta$;

defining one of vertexes of each of the reference blocks as a rotation center vertex;

rotating each of the reference blocks about the rotation center vertex by an angle of $\theta$ to obtain a rotation block;

calculating shift quantities $\Delta Y$ and $\Delta X$ of the rotation center vertex of each of the rotation blocks, wherein the shift quantities $\Delta Y$ and $\Delta X$ result from a rotation of the rotation center vertex about the reference point through an angle of $\theta$, and wherein the shift quantity $\Delta Y$ is defined as extending along the reference coordinate axis and the shift quantity $\Delta X$ is defined as extending perpendicular to the reference coordinate axis; and translating the rotation block in a direction of the reference coordinate axis by the shift quantity $\Delta Y$ and translating the rotation block in a direction perpendicular to the reference coordinate axis by the shift quantity $\Delta X$ o obtain the destination image.

5. The method of claim 4 further comprising the steps of:

setting a Y axis equal to an axis which passes through the rotation center vertex and which extends parallel to the reference coordinate axis;

setting an X axis equal to an axis which passes through the rotation center vertex and which extends perpendicular to the Y axis;

representing an X axis coordinate and a Y axis coordinate of each of elements composing the reference block by (x,y);

shifting the element in a direction of the X axis so that the x coordinate of the element will be equal to a value given as:

$x - y^* \tan \theta$ where a character "*" denotes an operator of product;

multiplying the x coordinate of the element by $\cos \theta$ so that the x coordinate will be equal to a value given as:

$x^* \cos \theta - y^* \sin \theta$ multiplying the y coordinate of the element by $1/\cos \theta$ so that the y coordinate will be equal to a value given as:

$y/\cos \theta$ whereby the element having the coordinate (x,y) is shifted to the coordinate ($x^* \cos \theta - y^* \sin \theta$, $y/\cos \theta$);

transforming the reference block into a parallelogram by the shift of the elements, wherein the parallelogram is equal to the rotation block in lengths of directions of the X axis and the Y axis, and wherein the parallelogram has a first triangular part and a second triangular part extending outward and inward of the rotation block respectively;

reading out each of row bit arrangements parallel to the X axis with respect to the first triangular part;

executing an OR operation between the readout row bit arrangements and corresponding row bit arrangements of the second triangular part so that the first triangular part will match to the second triangular part to obtain a matrix of N rows×N columns which has a shape corresponding to a shape of the rotation block;

deriving a first transposed matrix with respect to the matrix of N rows×N columns;

with respect to each of rows of the first transposed matrix where bits of the first triangular part are arranged from a left-hand end toward a right-hand end of the row, executing a left rotation of the row by a number of the bits of the first triangular part to obtain a rotation image;

deriving a second transposed matrix with respect to the rotation image; and using the second transposed matrix as the rotation block.

6. The method of claim 5 wherein each of the first and second transposed matrix deriving steps comprises:

calculating a conversion mode number M with respect to the matrix of N rows×N columns by referring to an equation expressed as: $M=[\log_2 N]$ where when a numeral within a bracket "[ ]" is equal to an integer, the bracket denotes the integer; and when a numeral within the bracket contains a fraction, the bracket denotes an integer which is obtained by counting the fraction as one;

numbering the N rows by $0 \sim N-1$;

calculating rows having numbers A and B for each of conversion modes L $(=1 \sim M)$ by referring to equations expressed as:

$A = k^* 2^L \sim k^* 2^L + 2^{L-1} - 1$ $B = A + 2^{L-1}$ $k = 0 \sim (N/2^L) - 1$ where a character "*" denotes an operator of product;

representing row bit arrangements of the rows having the numbers A and B by A(j) and B(j) respectively;

converting the row bit arrangements A(j) and B(j) into bit arrangements A'(j) and B'(j) by referring to equations expressed as:

$A'(j) = A(j)$
$j = k^* 2^L \sim k^* 2^L + 2^{L-1} - 1$
$A'(j) = B(j - 2^{L-1})$ -continued
$$j = k*2^L + 2^{L-1} \sim k*2^L + 2^L - 1$$
$$B'(j) = B(j)$$
$$j = k*2^L + 2^{L-1} \sim k*2^L + 2^L - 1$$
$$B'(j) = A(j + 2^{L-1})$$
$$j = k*2^L \sim k*2^L + 2^{L-1} - 1$$
$$k = 0 \sim (N/2^L) - 1$$

varying L from 1 to M and thereby deriving a matrix of N rows×N columns which is used as the transposed matrix.

7. The method of claim 4 further comprising the steps of:

setting a Y axis equal to an axis which passes through the rotation center vertex and which extends parallel to the reference coordinate axis;

setting an X axis equal to an axis which passes through the rotation center vertex and which extends perpendicular to the Y axis;

representing an X axis coordinate and a Y axis coordinate of each of elements composing the reference block by (x,y);

shifting the element in a direction of the X axis so that the x coordinate of the element will be equal to a value given as:

$$x - y* \tan \theta$$

where a character "*" denotes an operator of product;

multiplying the x coordinate of the element by $\cos \theta$ so that the x coordinate will be equal to a value given as:

$$x* \cos \theta - y* \sin \theta$$

multiplying the y coordinate of the element by $1/\cos \theta$ so that the y coordinate will be equal to a value given as:

$$y/\cos \theta$$

whereby the element having the coordinate (x,y) is shifted to the coordinate (x* cos θ − y* sin θ, y/cos θ);

transforming the reference block into a parallelogram by the shift of the elements, wherein the parallelogram are equal to the rotation block in lengths of directions of the X axis and the Y axis, wherein the parallelogram has a first triangular part and a second triangular part extending outward and inward of the rotation block respectively, and wherein the first triangular part is composed of an n number of row bit arrangements parallel to the X axis;

numbering rows of the parallelogram of n+N rows by 0~n+n−1;

generating a mask matrix divided into a first region and a second region, wherein the first region corresponds to the second triangular part and is "0", and wherein the second region is "1";

executing an AND operation between the "0" row ~ the "n" row and the mask matrix to generate a "0'" row ~ an "n'" row;

masking a part of the "1'" row which corresponds to a part of the "0'" row where bits differ from "0", and setting the masked part equal to "0";

executing an OR operation between the masked row and the "0'" row to generate a revised "0'" row;

masking a part of the "2'" row which corresponds to a part of the revised "0'" row where bits differ from "0", and setting the masked part equal to "0";

executing an OR operation between the masked row and the revised "0'" row to generate a revised "1'" row;

masking a part of the "3'" row which corresponds to a part of the revised "1'" row where bits differ from "0", and setting the masked part equal to "0";

executing an OR operation between the masked row and the revised "1'" row to generate a revised "2'" row;

similarly masking a part of the "n'" row which corresponds to a part of the revised "(n−2)'" row where bits differ from "0", and setting the masked part equal to "0";

similarly executing an OR operation between the masked row and the revised "(n−2)'" row to generate a revised "(n−1)'" row;

setting the revised "(n−1)'" row as a "0" row; and deriving subsequent rows up to an N−1 row by similar steps to obtain a matrix of N rows×N columns which is used as the rotation block.

8. An apparatus for rotating a source video image about a reference point on a reference coordinate axis through an arbitrary angle θ to obtain a destination video image, comprising:

means for representing the source image by a group of reference blocks, wherein each of the reference blocks has N×N pixels and is composed of a square having a side parallel to an axis which is rotated relative to the reference coordinate axis by an angle of −θ;

means for defining one of vertexes of each of the reference blocks as a rotation center vertex;

means for rotating each of the reference blocks about the rotation center vertex by an angle of θ to obtain a rotation block;

means for calculating shift quantities ΔY and ΔX of the rotation center vertex of each of the rotation blocks, wherein the shift quantities ΔY and ΔX result from a rotation of the rotation center vertex about the reference point through an angle of θ, and wherein the shift quantity ΔY is defined as extending along the reference coordinate axis and the shift quantity ΔX is defined as extending perpendicular to the reference coordinate axis; and means for translating the rotation block in a direction of the reference coordinate axis by the shift quantity ΔY and translating the rotation block in a direction perpendicular to the reference coordinate axis by the shift quantity ΔX to obtain the destination image.

9. The apparatus of claim 8 further comprising:

means for setting a Y axis equal to an axis which passes through the rotation center vertex and which extends parallel to the reference coordinate axis;

means for setting an X axis equal to an axis which passes through the rotation center vertex and which extends perpendicular to the Y axis;

means for representing an X axis coordinate and a Y axis coordinate of each of elements composing the reference block by (x,y);

means for shifting the element in a direction of the X axis so that the x coordinate of the element will be equal to a value given as:

$$x - y^* \tan \theta$$

where a character "*" denotes an operator of product;

means for multiplying the x coordinate of the element by cos θ so that the x coordinate will be equal to a value given as:

$$x^* \cos \theta - y^* \sin \theta$$

means for multiplying the y coordinate of the element by 1/cos θ so that the y coordinate will be equal to a value given as:

$$y/\cos \theta$$

whereby the element having the coordinate (x,y) is shifted to the coordinate (x* cos θ − y* sin θ, y/cos θ);

means for transforming the reference block into a parallelogram by the shift of the elements, wherein the parallelogram are equal to the rotation block in lengths of directions of the X axis and the Y axis, and wherein the parallelogram has a first triangular part and a second triangular part extending outward and inward of the rotation block respectively;

means for reading out each of row bit arrangements parallel to the X axis with respect to the first triangular part;

means for executing an OR operation between the readout row bit arrangements and corresponding row bit arrangements of the second triangular part so that the first triangular part will match to the second triangular part to obtain a matrix of N rows×N columns which has a shape corresponding to a shape of the rotation block;

means for deriving a first transposed matrix with respect to the matrix of N rows×N columns;

with respect to each of rows of the first transposed matrix where bits of the first triangular part are arranged from a left-hand end toward a right-hand end of the row, means for executing a left rotation of the row by a number of the bits of the first triangular part to obtain a rotation image;

means for deriving a second transposed matrix with respect to the rotation image; and means for using the second transposed matrix as the rotation block.

10. The apparatus of claim 9 wherein each of the first and second transposed matrix deriving means comprises:

means for calculating a conversion mode number M with respect to the matrix of N rows×N columns by referring to an equation expressed as: M=[log₂N] where when a numeral within a bracket "[ ]" is equal to an integer, the bracket denotes the integer; and when a numeral within the bracket contains a fraction, the bracket denotes an integer which is obtained by counting the fraction as one;

means for numbering the N rows by 0∼N−1;

means for calculating rows having numbers A and B for each of conversion modes L (=1∼M) by referring to equations expressed as:

$$A = k*2^L \sim k*2^L + 2^{L-1} - 1$$

$$B = A + 2^{L-1}$$

$$k = 0 \sim (N/2^L) - 1$$

where a character "*" denotes an operator of product;

means for representing row bit arrangements of the rows having the numbers A and B by A(j) and B(j) respectively;

means for converting the row bit arrangements A(j) and B(j) into bit arrangements A'(j) and B'(j) by referring to equations expressed as:

$$A'(j) = A(j)$$
$$j = k*2^L \sim k*2^L + 2^{L-1} - 1$$
$$A'(j) = B(j - 2^{L-1})$$
$$j = k*2^L + 2^{L-1} \sim k*2^L + 2^L - 1$$
$$B'(j) = B(j)$$
$$j = k*2^L + 2^{L-1} \sim k*2^L + 2^L - 1$$
$$B'(j) = A(j + 2^{L-1})$$
$$j = k*2^L \sim k*2^L + 2^{L-1} - 1$$
$$k = 0 \sim (N/2^L) - 1$$

means for varying L from 1 to M and thereby deriving a matrix of N rows×N columns which is used as the transposed matrix.

11. The apparatus of claim 8 further comprising:

means for setting a Y axis equal to an axis which passes through the rotation center vertex and which extends parallel to the reference coordinate axis;

means for setting an X axis equal to an axis which passes through the rotation center vertex and which extends perpendicular to the Y axis;

means for representing an X axis coordinate and a Y axis coordinate of each of elements composing the reference block by (x,y);

means for shifting the element in a direction of the X axis so that the x coordinate of the element will be equal to a value given as:

$$x - y^* \tan \theta$$

where a character "*" denotes an operator of product;

means for multiplying the x coordinate of the element by cos θ so that the x coordinate will be equal to a value given as:

$$x^* \cos \theta - y^* \sin \theta$$

means for multiplying the y coordinate of the element by 1/cos θ so that the y coordinate will be equal to a value given as:

$$y/\cos \theta$$

whereby the element having the coordinate (x,y) is shifted to the coordinate (x* cos θ − y* sin θ, y/cos θ);

means for transforming the reference block into a parallelogram by the shift of the elements, wherein the parallelogram are equal to the rotation block in lengths of directions of the X axis and the Y axis, wherein the parallelogram has a first triangular part and a second triangular part extending outward and inward of the rotation block respectively, and wherein the first triangular part is composed of an n number of row bit arrangements parallel to the X axis;

means for numbering rows of the parallelogram of n+N rows by 0∼n+n−1;

means for generating a mask matrix divided into a first region and a second region, wherein the first region corresponds to the second triangular part and is "0", and wherein the second region is "1";

means for executing an AND operation between the "0" row ~ the "n" row and the mask matrix to generate a "0'" row ~ an "n'" row;

means for masking a part of the "1'" row which corresponds to a part of the "0'" row where bits differ from "0", and setting the masked part equal to "0";

means for executing an OR operation between the masked row and the "0'" row to generate a revised "0'" row;

means for masking a part of the "2'" row which corresponds to a part of the revised "0'" row where bits differ from "0", and setting the masked part equal to "0";

means for executing an OR operation between the masked row and the revised "0'" row to generate a revised "1'" row;

means for masking a part of the "3'" row which corresponds to a part of the revised "1'" row where bits differ from "0", and setting the masked part equal to "0";

means for executing an OR operation between the masked row and the revised "1'" row to generate a revised "2'" row;

means for similarly masking a part of the "n'" row which corresponds to a part of the revised "(n−2)'" row where bits differ from "0", and setting the masked part equal to "0";

means for similarly executing an OR operation between the masked row and the revised "(n−2)'" row to generate a revised "(n−1)'" row;

means for setting the revised "(n−1)'" row as a "0" row; and means for deriving subsequent rows up to an N−1 row by similar steps to obtain a matrix of N rows×N columns which is used as the rotation block.

* * * * *